(12) United States Patent
Zhang

(10) Patent No.: US 11,641,246 B2
(45) Date of Patent: May 2, 2023

(54) OPTICAL SWITCHING APPARATUS AND SYSTEM, AND POWER CALCULATION METHOD

(71) Applicant: HUAWEI TECHNOLOGIES CO., LTD., Guangdong (CN)

(72) Inventor: Chunhui Zhang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/362,874

(22) Filed: Jun. 29, 2021

(65) Prior Publication Data

US 2021/0328702 A1      Oct. 21, 2021

Related U.S. Application Data

(63) Continuation of application No. PCT/CN2019/129729, filed on Dec. 30, 2019.

(30) Foreign Application Priority Data

Dec. 29, 2018   (CN) .......................... 201811640720.9

(51) Int. Cl.
*H04J 14/00*    (2006.01)
*H04J 14/02*    (2006.01)
*H04Q 11/00*    (2006.01)

(52) U.S. Cl.
CPC ...... *H04J 14/0221* (2013.01); *H04J 14/0202* (2013.01); *H04Q 11/0005* (2013.01); *H04Q 2011/0016* (2013.01)

(58) Field of Classification Search
CPC .............. H04J 14/0221; H04J 14/0202; H04Q 11/0005; H04Q 2011/0016
See application file for complete search history.

(56) References Cited

U.S. PATENT DOCUMENTS 6,256,125 B1   7/2001   Uehara
6,538,782 B1   3/2003   Otsuka et al.
(Continued)

FOREIGN PATENT DOCUMENTS

CN      101227247 A     7/2008
CN      102696194 A     9/2012
(Continued)

*Primary Examiner* — Pranesh K Barua

(57) ABSTRACT

This application provides an optical switching apparatus. The apparatus includes: a first optical switch, L first wavelength division multiplexers/demultiplexers, L second wavelength division multiplexers/demultiplexers, a beam generation apparatus connected to the L first wavelength division multiplexers/demultiplexers, and a detection apparatus connected to the L second wavelength division multiplexers/demultiplexers. One of a plurality of multiplexing ports of the first wavelength division multiplexer/demultiplexer is a signal light port, and a remaining multiplexing port is connected to the beam generation apparatus. A plurality of demultiplexing ports of the first wavelength division multiplexer/demultiplexer are connected to the first optical switch. One of a plurality of multiplexing ports of the second wavelength division multiplexer/demultiplexer is a signal light port, and a remaining multiplexing port is connected to the detection apparatus. A plurality of demultiplexing ports of the second wavelength division multiplexer/demultiplexer are connected to the first optical switch.

19 Claims, 19 Drawing Sheets

(56) References Cited

U.S. PATENT DOCUMENTS

| | | | |
|---|---|---|---|
| 7,130,505 B2 | 10/2006 | Shen | |
| 7,254,327 B1 * | 8/2007 | Zhong | ................ H04B 10/0775 709/224 |
| 2004/0208541 A1 | 10/2004 | Gripp et al. | |
| 2009/0274459 A1 * | 11/2009 | Takita | ................ H04Q 11/0005 398/48 |
| 2017/0019168 A1 | 1/2017 | Menard et al. | |
| 2017/0116515 A1 | 4/2017 | Abel et al. | |

FOREIGN PATENT DOCUMENTS

| | | | |
|---|---|---|---|
| CN | 104661117 A | 5/2015 |
| CN | 207135105 U | 3/2018 |
| CN | 108370268 A | 8/2018 |
| CN | 108964754 A | 12/2018 |
| GB | 2376531 A | 12/2002 |
| JP | 2014204420 A | 10/2014 |
| KR | 19980047794 A | 9/1998 |
| WO | 0152453 A1 | 7/2001 |

\* cited by examiner

OPTICAL SWITCHING APPARATUS AND SYSTEM, AND POWER CALCULATION METHOD

CROSS-REFERENCE TO RELATED APPLICATIONS

This application is a continuation of International Application No. PCT/CN2019/129729, filed on Dec. 30, 2019, which claims priority to Chinese Patent Application No. 201811640720.9, filed on Dec. 29, 2018. The disclosures of the aforementioned applications are hereby incorporated by reference in their entireties.

TECHNICAL FIELD

Embodiments of this application relate to the field of optical communications technologies, and in particular, to an optical switching apparatus, an optical switching system, and a power calculation method based on the apparatus.

BACKGROUND

With the development of a dense wavelength division multiplexing (DWDM) technology, a speed and a capacity of information transmission on an optical fiber communications link are increasing, and demands for a speed and a capacity of information exchange in an optical communications network (such as a metropolitan area network or a data center) are increasing accordingly. All-optical switching system has become a development trend of the optical communications network.

A networking manner of an all-optical communications network is an optical cross-connect (OXC) optical switching system. An insertion loss of any node in the OXC optical switching system is usually detected by using an optical splitting detection method. As shown in FIG. 1, one optical splitter 103 (a 5% optical splitter is used as an example in FIG. 1) is connected in series on each optical channel between an AWG 102 and an optical switch 101, and one photodetector (PD) 104 is connected to an optical splitting port of the optical splitter 103. One optical splitter 106 is also connected in series to each tributary port of the optical switch 101, and one PD 105 is connected to an optical splitting port of the optical splitter 106.

When service light passes through the optical channel between the AWG 102 and the optical switch 101, a part of the service light enters the PD 104 through the optical splitter 103. Based on an optical power detected by the PD 104 and a split ratio of the optical splitter 103, an input optical power of the optical switch 101 and an output optical power of the optical switch 101 may be calculated. Further, an insertion loss of the optical switch may be calculated based on the input optical power of the optical switch 101 and the output optical power of the optical switch 101.

However, in FIG. 1, the insertion loss of the optical switch can be detected only when service light exists on an optical channel. For an optical channel without service light, because the PD cannot detect an optical power, the insertion loss of the optical switch cannot be detected.

SUMMARY

Embodiments of this application provide an optical switching apparatus, to resolve a problem of how to detect an insertion loss of an optical switch for an optical channel without service light.

To resolve the foregoing technical problem, the embodiments of this application provide the following technical solutions.

According to a first aspect, an embodiment of this application provides an optical switching apparatus, including: a first optical switch, L first wavelength division multiplexers/demultiplexers and L second wavelength division multiplexers/demultiplexers, a beam generation apparatus connected to the L first wavelength division multiplexers/demultiplexers, and a detection apparatus connected to the L second wavelength division multiplexers/demultiplexers, where the L first wavelength division multiplexers/demultiplexers and the L second wavelength division multiplexers/demultiplexers are connected to the first optical switch, and L is a positive integer. The first wavelength division multiplexer/demultiplexer and the second wavelength division multiplexer/demultiplexer each include a plurality of multiplexing ports and a plurality of demultiplexing ports. One of the plurality of multiplexing ports of the first wavelength division multiplexer/demultiplexer is a signal light port, and a remaining multiplexing port is connected to the beam generation apparatus. The plurality of demultiplexing ports of the first wavelength division multiplexer/demultiplexer are connected to the first optical switch. One of the plurality of multiplexing ports of the second wavelength division multiplexer/demultiplexer is a signal light port, and a remaining multiplexing port is connected to the detection apparatus. The plurality of demultiplexing ports of the second wavelength division multiplexer/demultiplexer are connected to the first optical switch.

According to a second aspect, an embodiment of this application provides an optical switching system. The optical switching system includes at least two optical switching apparatuses described in any one of the first aspect or the possible implementations of the first aspect.

According to a third aspect, an embodiment of this application provides a power calculation method for laser light, where the method is used for an optical switching apparatus. The optical switching apparatus includes: a first optical switch, L first wavelength division multiplexers/demultiplexers and L second wavelength division multiplexers/demultiplexers, a beam generation apparatus connected to the L first wavelength division multiplexers/demultiplexers, and a detection apparatus connected to the L second wavelength division multiplexers/demultiplexers, where the L first wavelength division multiplexers/demultiplexers and the L second wavelength division multiplexers/demultiplexers are connected to the first optical switch, and L is a positive integer. The method includes: The beam generation apparatus inputs first laser light to a multiplexing port other than a signal light port in a plurality of multiplexing ports of any first wavelength division multiplexer/demultiplexer in the L first wavelength division multiplexers/demultiplexers. The first wavelength division multiplexer/demultiplexer that receives the first laser light inputs the first laser light through one of a plurality of demultiplexing ports of the first wavelength division multiplexer/demultiplexer to the first optical switch. The first optical switch inputs the first laser light to a corresponding demultiplexing port of any second wavelength division multiplexer/demultiplexer in the L second wavelength division multiplexers/demultiplexers. The second wavelength division multiplexer/demultiplexer that receives the first laser light inputs the first laser light through one multiplexing port other than the signal light port in a plurality of multiplexing ports of the second wavelength division multiplexer/demultiplexer to the detection apparatus. The detection apparatus obtains an output power of the first laser light.

DESCRIPTION OF EMBODIMENTS

To clearly describe the technical solutions in embodiments of this application, terms such as "first" and "second" are used in the embodiments of this application to distinguish between same items or similar items that have basically same functions and purposes. For example, first laser light and second laser light are merely intended to distinguish between different laser light, and do not limit a sequence of the first laser light and the second laser light. Persons skilled in the art may understand that the terms such as "first" and "second" do not constitute a limitation on a quantity or an execution sequence, and that the terms such as "first" and "second" do not indicate a definite difference.

It should be noted that, in this application, the word "exemplary" or "for example" is used to represent giving an example, an illustration, or a description. Any embodiment or design scheme described as an "exemplary" or "for example" in this application should not be explained as being more preferred or having more advantages than another embodiment or design scheme. Exactly, use of the word "exemplary" or "example" is intended to present a relative concept in a specific manner.

In this application, "at least one" refers to one or more, and "a plurality of" refers to two or more. The term "and/or" describes an association relationship for describing associated objects and represents that three relationships may exist. For example, A and/or B may represent the following cases: Only A exists, both A and B exist, and only B exists, where A and B may be singular or plural. The character "l" generally indicates an "or" relationship between the associated objects. "At least one of the following" or a similar expression thereof indicates any combination of the following, including any combination of one or more of the following. For example, at least one of a, b, or c may indicate: a, b, c, a and b, a and c, b and c, or a, b, and c, where a, b, and c may be singular or plural.

Figure 1:
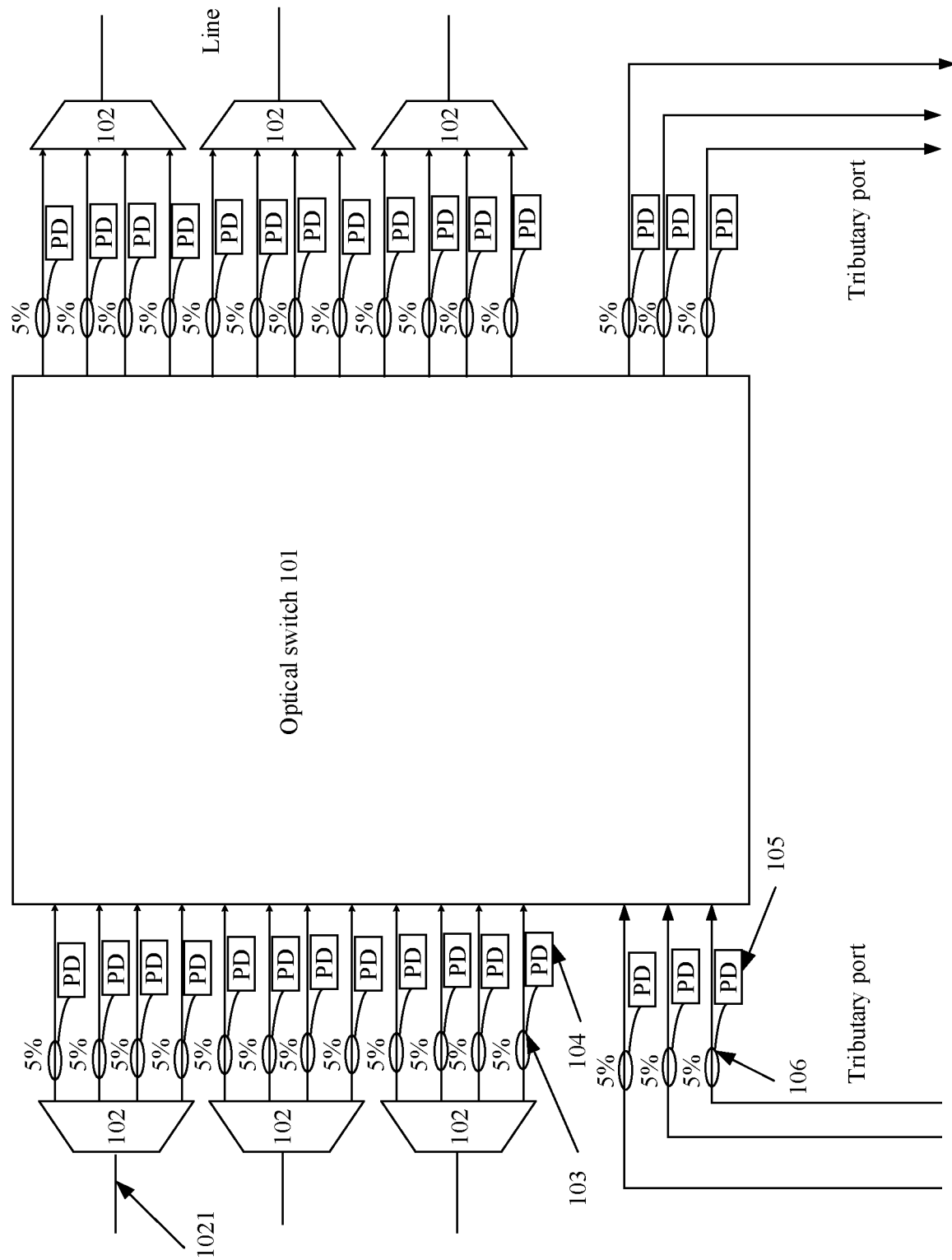
FIG. 1 is a schematic diagram of any node of an optical switching system according to an embodiment of this application.
Figure 2:
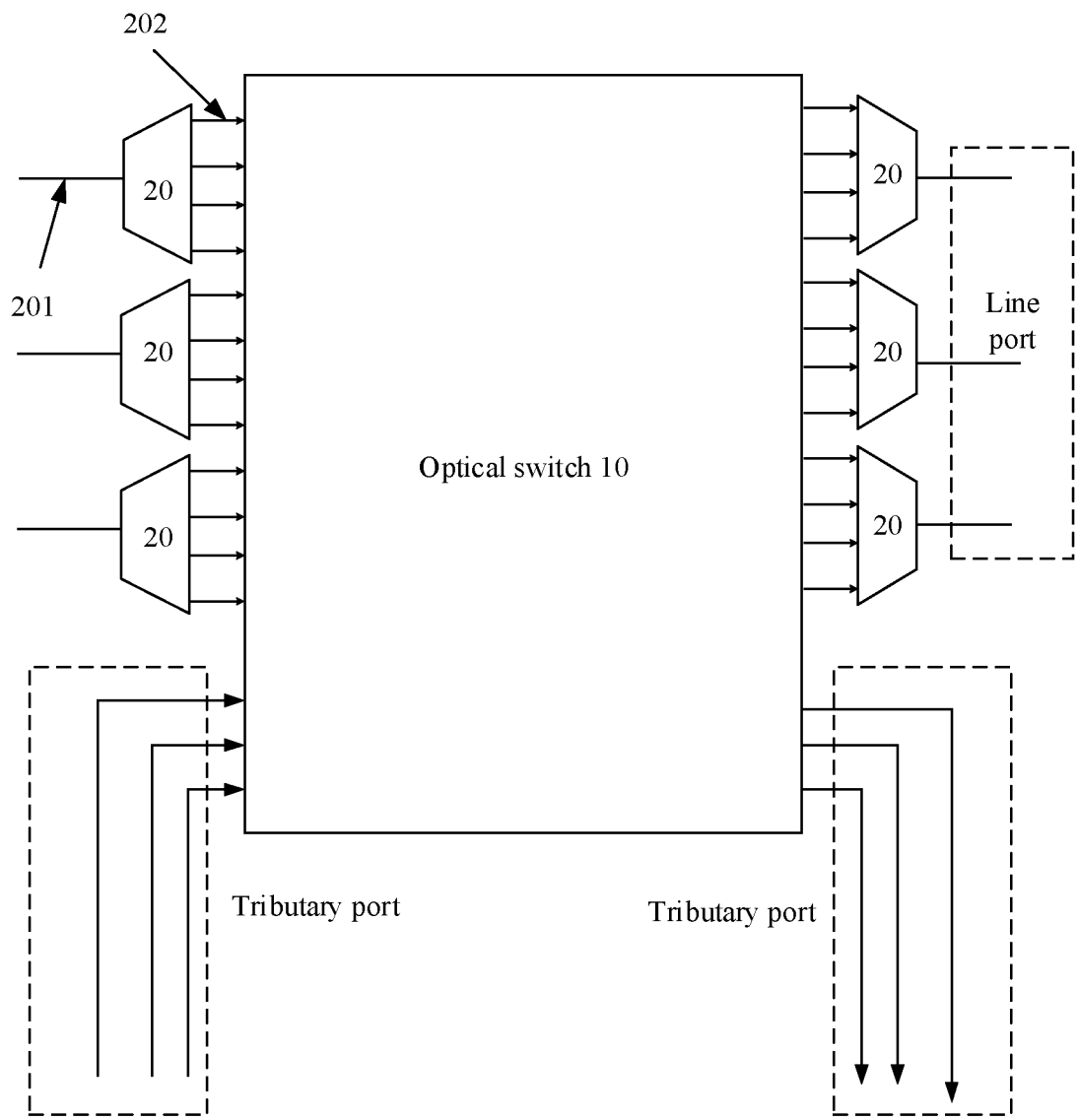
FIG. 2 is a schematic diagram of a structure of an optical switching system according to an embodiment of this application.

As shown in FIG. 2, in an OXC optical switching system, any node includes an optical switch 10 and at least one arrayed waveguide grating (AWG) 20. The AWG 20 includes one multiplexing port 201 and N demultiplexing ports 202. The multiplexing port 201 serves as a line port and is used to communicate with another node in the OXC optical switching system, and the demultiplexing port 202 is connected to the optical switch 10. A port that is of the optical switch 10 and that is not connected to the AWG 20 serves as a tributary port and is used to communicate with a local service board.

An embodiment of this application provides an optical switching apparatus, including L first wavelength division multiplexers/demultiplexers and L second wavelength division multiplexers/demultiplexers. Each wavelength division multiplexer/demultiplexer has a signal light port and a remaining multiplexing port. In this way, laser light may be input to the remaining multiplexing port of the L first wavelength division multiplexers/demultiplexers by a beam generation apparatus, and then a first optical switch inputs the received laser light to demultiplexing ports of the L second wavelength division multiplexers/demultiplexers. Then, any second wavelength division multiplexer/demultiplexer that receives the laser light and that is in the L second wavelength division multiplexers/demultiplexers sends the received laser light through a remaining multiplexing port of the second wavelength division multiplexer/demultiplexer to a detection apparatus, so that the detection apparatus obtains an output power of the output laser light. In comparison with the conventional technology, the optical switching apparatus provided in this embodiment of this application can still obtain the output power of the laser light when there is no signal light, so as to obtain an insertion loss of the first optical switch based on an input power of the laser light and the output power of the laser light.

The following provides related explanations of terms used in the embodiments with reference to the embodiments of this application.

(1) A pass-through channel is an optical signal channel between line ports. To be specific, laser light is input to a first optical switch by a first wavelength division multiplexer/demultiplexer, and then is input to a second wavelength division multiplexer/demultiplexer by the first optical switch. The laser light is then output by the second wavelength division multiplexer/demultiplexer. Alternatively, laser light is input to a first optical switch by a second wavelength division multiplexer/demultiplexer, and then is input to a first wavelength division multiplexer/demultiplexer by the first optical switch. The laser light is then output by the first wavelength division multiplexer/demultiplexer.

Figure 3:
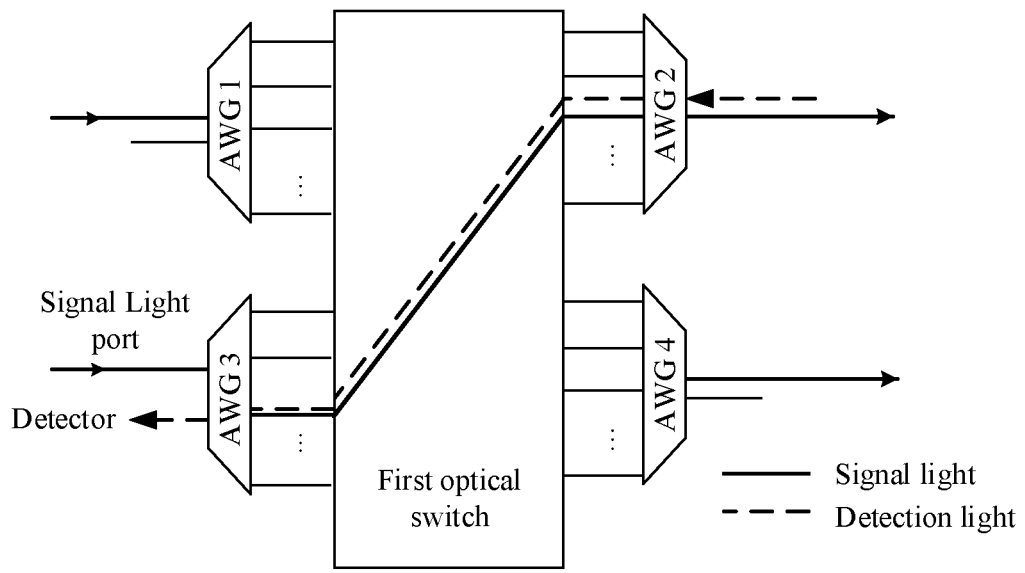
FIG. 3 is a schematic diagram of an optical path of a pass-through channel according to an embodiment of this application.

It should be noted that, on the pass-through channel, a transmission direction of detection light in the first optical switch may be the same as or opposite to a transmission direction of signal light in the first optical switch. In FIG. 3 in the following embodiment, a case in which a transmission direction of detection light in an optical switch may be opposite to a transmission direction of signal light in the optical switch is used as an example.

For example, as shown in FIG. 3, the second wavelength division multiplexer/demultiplexer is an AWG 3, and the first wavelength division multiplexer/demultiplexer is an AWG 2. Signal light with a wavelength of $\lambda_3$ is input through a signal light port of the AWG 3, and is output through a demultiplexing port 3 of the AWG 3. After passing through the first optical switch, the signal light with the wavelength of $\lambda_3$ is input through a demultiplexing port 3 of the AWG 2, and is output through a signal light port of the AWG 2. Detection light with a wavelength of $\lambda'_3$ is input through a multiplexing port that is used as a detection light port and that is of the AWG 2, and is output through the demultiplexing port 3 of the AWG 2. After passing through the first optical switch, the detection light with the wavelength of $\lambda'_3$ is input through the demultiplexing port 3 of the AWG 3, is output through a multiplexing port of the AWG 3, and is received and detected by a detector. The detector detects an output power of the detection light with the wavelength of $\lambda'_3$. In this way, an insertion loss 1 of the detection light with the wavelength of $\lambda'_3$ on the entire pass-through channel can be obtained based on the output power of the detection light with the wavelength of $\lambda'_3$ and an input power of the detection light with the wavelength of $\lambda'_3$. By subtracting an insertion loss of components through which the detection light with the wavelength of $\lambda'_3$ passes on an optical path of the pass-through channel (for example, an insertion loss of the AWG 2 and the AWG 3) from the insertion loss 1, an insertion loss of the detection light with the wavelength of $\lambda'_3$ on the pass-through channel in the first optical switch can be obtained. Because the first optical switch is insensitive to a wavelength, the insertion loss of the detection light with the wavelength of $\lambda'_3$ on the pass-through channel in the first optical switch may be approximately considered as a loss value of the signal light with the wavelength of $\lambda_3$ in the first optical switch.

By adjusting a wavelength of a tunable light source, an insertion loss of signal light of an optical signal channel corresponding to the AWG 2 can be detected.

(2) A wavelength-adding channel is an optical signal channel from a tributary port to a line port. To be specific, laser light is input to a first optical switch through a first tributary port or a second tributary port, and then is input to a second wavelength division multiplexer/demultiplexer or a first wavelength division multiplexer/demultiplexer by the first optical switch. The laser light is then output by the second wavelength division multiplexer/demultiplexer or the first wavelength division multiplexer/demultiplexer.

Figure 4:
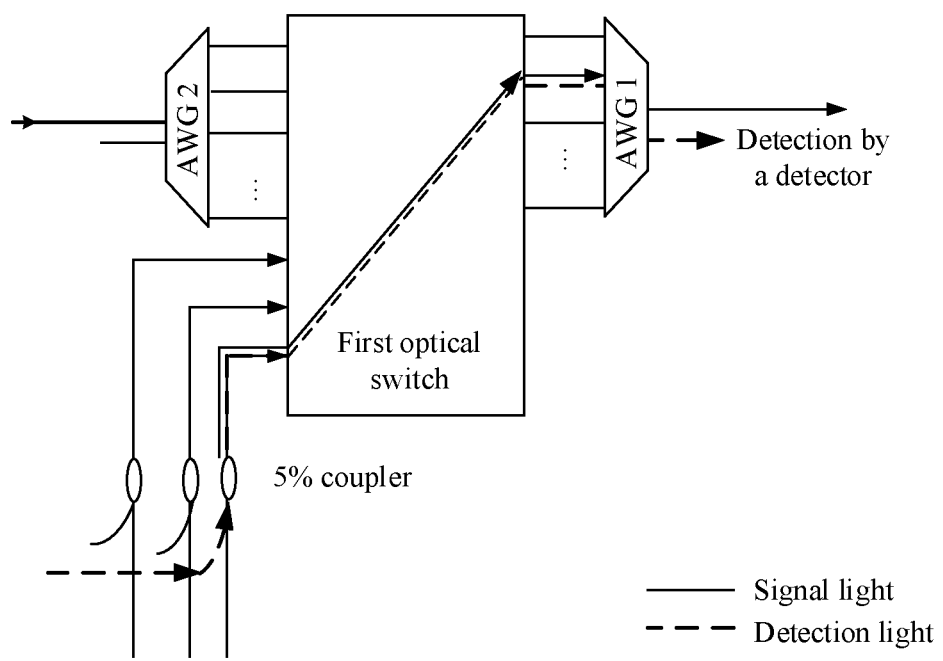
FIG. 4 is a schematic diagram of an optical path of a wavelength-adding channel according to an embodiment of this application.

For example, a detection method for the wavelength-adding channel is shown in FIG. 4. A transmission direction of detection light in the first optical switch may be the same as or opposite to a transmission direction of signal light in the first optical switch. In FIG. 4, a case in which a transmission direction of detection light is the same as a transmission direction of signal light is used as an example.

Signal light with a wavelength of $\lambda_2$ is input through a 95% port of a coupler, enters one first tributary port of the first optical switch, and is input through a demultiplexing port 2 of an AWG 1 after passing through the first optical switch. The signal light with the wavelength of $\lambda_2$ is output through a signal light port of the AWG 1.

Detection light with a wavelength of $\lambda'_2$ is input through a 5% port of the coupler, and enters one first tributary port of the first optical switch. After passing through the first optical switch, the detection light with the wavelength of $\lambda'_2$ is input through the demultiplexing port 2 of the AWG 1, is output through a multiplexing port of the AWG 1, and is received and detected by a detector. In this way, the detector can detect an output power of the detection light with the wavelength of $\lambda'_2$.

Finally, based on the output power that is of the detection light with the wavelength of $\lambda'_2$ and that is detected by the detector and an input power of the detection light with the wavelength of $\lambda'_2$, an insertion loss 1 of the detection light with the wavelength of $\lambda'_2$ on the wavelength-adding channel can be obtained. By subtracting an insertion loss of components through which the detection light with the wavelength of $\lambda'_2$ passes on an optical path of the wavelength-adding channel (for example, an insertion loss of the AWG 1 and a 5% coupler) from the insertion loss 1 of the detection light with the wavelength of $\lambda'_2$ on the wavelength-adding channel, an insertion loss of the detection light with the wavelength of $\lambda'_2$ on the wavelength-adding channel in the first optical switch can be obtained. Because the first optical switch is insensitive to a wavelength, the insertion loss of the detection light with the wavelength of $\lambda'_2$ on the wavelength-adding channel in the first optical switch may be approximately considered as an insertion loss of the signal light with the wavelength of $\lambda_2$ on the wavelength-adding channel in the first optical switch.

(3) A wavelength-dropping channel is an optical signal channel from a line port to a tributary port. To be specific, laser light is input to a first optical switch by a second wavelength division multiplexer/demultiplexer or a first wavelength division multiplexer/demultiplexer, and then is input to a first tributary port or a second tributary port by the first optical switch. The laser light is then output through the first tributary port or the second tributary port.

Figure 5:
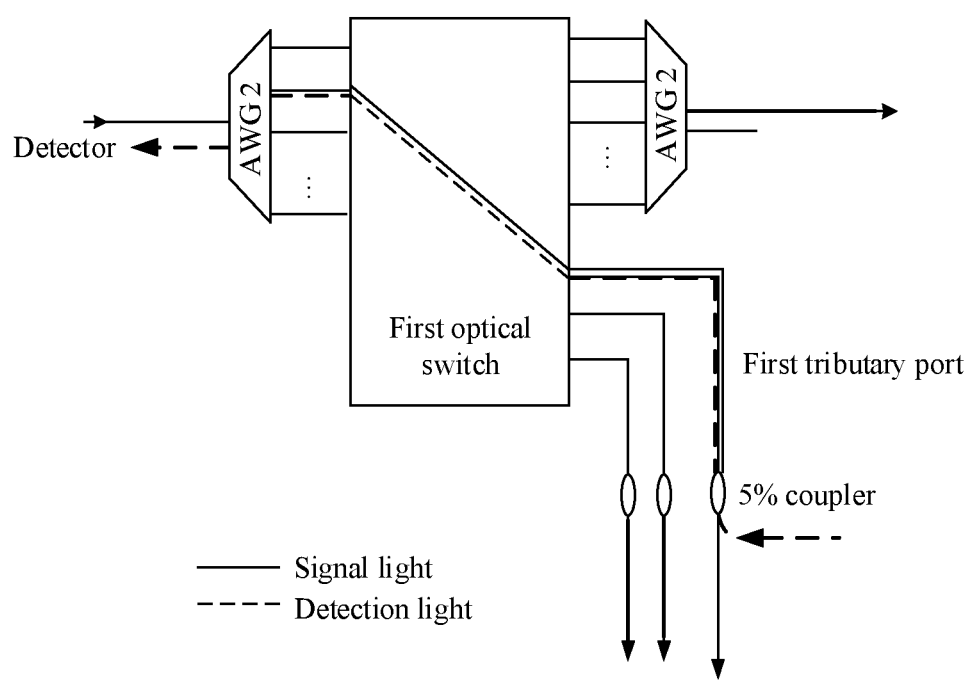
FIG. 5 is a schematic diagram of an optical path of a wavelength-dropping channel according to an embodiment of this application.

For example, a detection method for the wavelength-dropping channel is shown in FIG. 5. On the wavelength-dropping channel, a transmission direction of detection light and a transmission direction of signal light in the first optical switch need to be opposite.

Signal light with a wavelength of $\lambda_2$ is input through a signal light port of an AWG 2, output through a demultiplexing port 2, output through one tributary port of the first optical switch after passing through the first optical switch, and transmitted to a local service board after passing through a coupler.

Detection light with a wavelength of $\lambda'_2$ is input through a 5% port of the coupler, and enters a tributary port of the first optical switch. After passing through the first optical switch, the detection light with the wavelength of $\lambda'_2$ is input through a demultiplexing port 2 of the AWG 2, is output through a multiplexing port of the AWG 2, and is received and detected by a detector. In this way, the detector can detect and obtain an output power of the detection light with the wavelength of $\lambda'_2$.

Finally, based on the output power that is of the detection light with the wavelength of $\lambda'_2$ and that is detected by the detector and an input power of the detection light with the wavelength of $\lambda'_2$, an insertion loss 1 of the detection light with the wavelength of $\lambda'_2$ on the wavelength-dropping channel can be obtained. By subtracting an insertion loss of components through which the detection light with the wavelength of $\lambda'_2$ passes on an optical path of the wavelength-dropping channel (for example, an insertion loss of the AWG 1 and a 5% coupler) from the insertion loss 1 of the detection light with the wavelength of $\lambda'_2$ on the wavelength-dropping channel, an insertion loss of the detection light with the wavelength of $\lambda'_2$ on the wavelength-dropping channel in the first optical switch can be obtained. Because the first optical switch is insensitive to a wavelength, the insertion loss of the detection light with the wavelength of $\lambda'_2$ on the wavelength-dropping channel in the first optical switch may be approximately considered as an insertion loss of the signal light with the wavelength of $\lambda_2$ on the wavelength-dropping channel in the first optical switch.

It should be noted that, in this embodiment of this application, the insertion loss of the signal light with the wavelength of $\lambda_2$ in the first optical switch can be obtained based on the insertion loss of the detection light on the wavelength-dropping channel/the wavelength-adding channel/the pass-through channel in the first optical switch. If the insertion loss of the signal light with the wavelength of $\lambda_2$ on the wavelength-dropping channel/wavelength-adding channel/pass-through channel needs to be calculated, an insertion loss of components through which the signal light with the wavelength of $\lambda_2$ passes on the optical path of the wavelength-dropping channel/wavelength-adding channel/pass-through channel may be added to the insertion loss of the signal light with the wavelength of $\lambda_2$ in the first optical switch.

It should be understood that the wavelength-dropping channel, the wavelength-adding channel, and the pass-through channel in the embodiments of this application are transmitted in a unit of a wavelength.

It should be noted that an arrow in the embodiments of this application represents a propagation direction of signal light or detection light.

Figure 6:
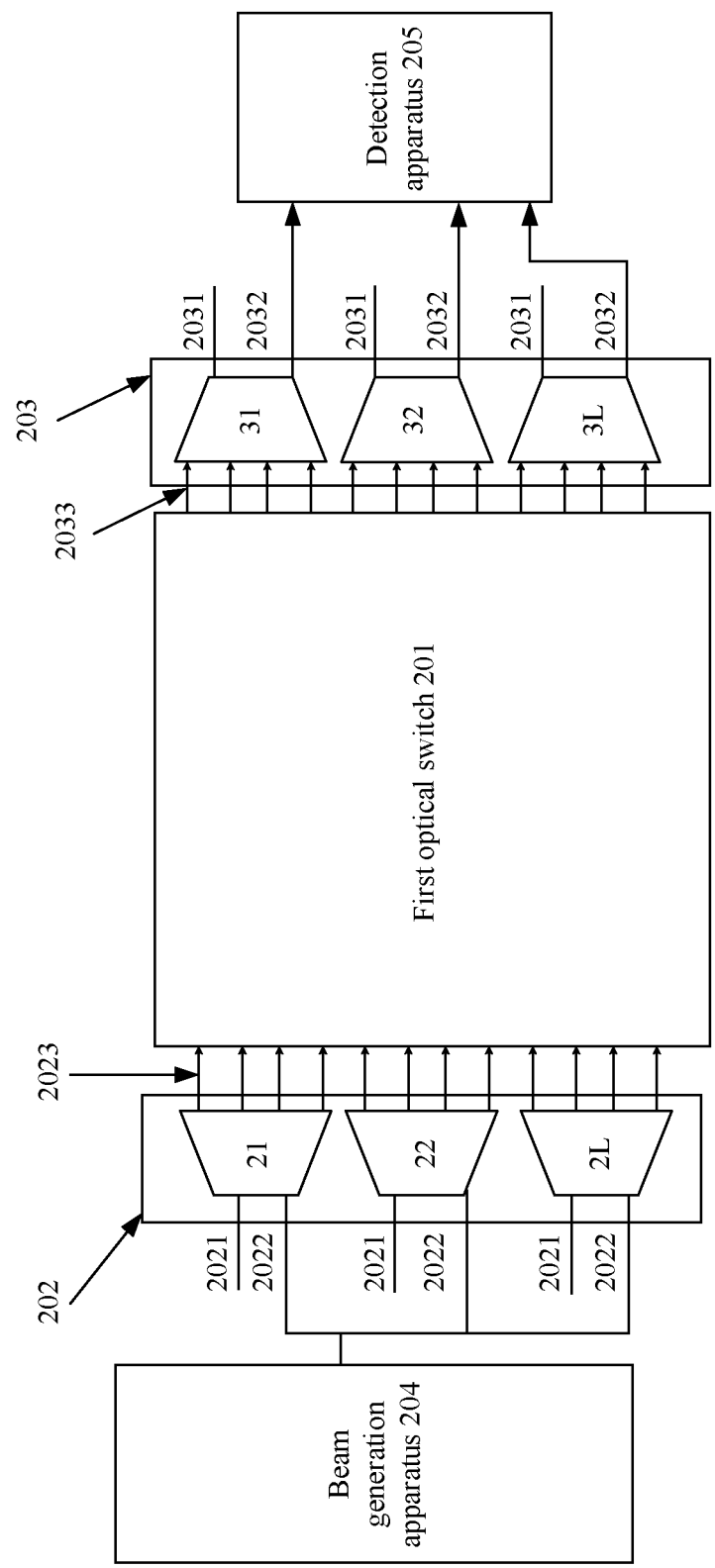
FIG. 6 to FIG. 17 are schematic diagrams of a structure of an optical switching apparatus according to an embodiment of this application.

FIG. 6 shows an optical switching apparatus 200 according to an embodiment of this application. The optical switching apparatus 200 includes: a first optical switch 201, L first wavelength division multiplexers/demultiplexers 202 connected to the first optical switch 201 (for example, a first wavelength division multiplexer/demultiplexer 21, a first wavelength division multiplexer/demultiplexer 22, ..., and a first wavelength division multiplexer/demultiplexer 2L shown in FIG. 6), L second wavelength division multiplexers/demultiplexers 203 connected to the first optical switch 201 (for example, a second wavelength division multiplexer/demultiplexer 31, a second wavelength division multiplexer/demultiplexer 32, ..., and a second wavelength division multiplexer/demultiplexer 3L in FIG. 6), a beam generation apparatus 204 connected to the L first wavelength division multiplexers/demultiplexers 202, and a detection apparatus 205 connected to the L second wavelength division multiplexers/demultiplexers 203. L is a positive integer.

The first wavelength division multiplexer/demultiplexer 202 includes a plurality of multiplexing ports and a plurality of demultiplexing ports (for example, a multiplexing port 2021, a multiplexing port 2022, and a demultiplexing port 2023 shown in FIG. 6). It should be understood that FIG. 6 shows two multiplexing ports, and in an actual process, there may be three or more multiplexing ports.

The second wavelength division multiplexer/demultiplexer 203 includes a plurality of multiplexing ports and a plurality of demultiplexing ports (for example, a multiplexing port 2031, a multiplexing port 2032, and a demultiplexing port 2033 shown in FIG. 6). One of the plurality of multiplexing ports of the first wavelength division multiplexer/demultiplexer 202 is a signal light port (for example, as shown in FIG. 6, the multiplexing port 2021 is a signal light port), and a remaining multiplexing port is connected to the beam generation apparatus 204. The plurality of demultiplexing ports of the first wavelength division multiplexer/demultiplexer 202 are connected to the first optical switch 201. One of the plurality of multiplexing ports of the second wavelength division multiplexer/demultiplexer 203 is a signal light port (for example, the multiplexing port 2031 is a signal light port), and a remaining multiplexing port is connected to the detection apparatus 205. The plurality of demultiplexing ports of the second wavelength division multiplexer/demultiplexer 203 are connected to the first optical switch 201. It should be understood that FIG. 6 shows two multiplexing ports, and in an actual process, there may be three or more multiplexing ports.

It should be understood that the signal light port is used to input signal light or output signal light. For example, the signal light port of the first wavelength division multiplexer/demultiplexer 202 is used to input signal light. The signal light port of the second wavelength division multiplexer/demultiplexer 203 is used to output signal light.

In this embodiment of this application, a plurality of multiplexing ports of any first wavelength division multiplexer/demultiplexer 202 in the L first wavelength division multiplexers/demultiplexers 202 and a plurality of multiplexing ports of any second wavelength division multiplexer/demultiplexer 203 in the L second wavelength division multiplexers/demultiplexers 203 may serve as line ports and are used to communicate with another node.

In this embodiment of this application, a signal light port of any first wavelength division multiplexer/demultiplexer 202 in the L first wavelength division multiplexers/demultiplexers 202 and a signal light port of any second wavelength division multiplexer/demultiplexer 203 in the L second wavelength division multiplexers/demultiplexers 203 use DWDM signal light.

It should be understood that, if the beam generation apparatus 204 is further configured to provide signal light for the L first wavelength division multiplexers/demultiplexers 202, the beam generation apparatus 204 is further connected to a signal light port of each first wavelength division multiplexer/demultiplexer 202 in the L first wavelength division multiplexers/demultiplexers 202.

The beam generation apparatus 204 in this embodiment of this application is configured to provide detection light for the remaining multiplexing port of the L first wavelength division multiplexers/demultiplexers 202. The remaining multiplexing port in the embodiments of this application may be referred to as a detection light port.

It should be understood that the signal light in the embodiments of this application refers to laser light that is modulated and that has a service signal. The detection light in the embodiments of this application refers to laser light that is not modulated and that does not have a service signal.

For example, the first wavelength division multiplexer/demultiplexer 202 and the second wavelength division multiplexer/demultiplexer 203 in this embodiment of this application may be arrayed waveguide gratings (AWG).

The optical switch in the embodiments of this application is a key component for implementing an all-optical switching system, and can implement functions at an all-optical layer such as route selection, wavelength selection, optical cross-connection, and self-healing protection. Currently, optical switches mainly include a conventional optical switch of a mechanical structure, a micro-electrical-mechanical system (MEMS) optical switch, a liquid crystal optical switch, a waveguide optical switch, a semiconductor optical amplifier optical switch, and the like.

The optical switching apparatus provided in this embodiment of this application includes the L first wavelength division multiplexers/demultiplexers and the L second wavelength division multiplexers/demultiplexers. Each wavelength division multiplexer/demultiplexer has a signal light port and a remaining multiplexing port. In this way, laser light may be input to the remaining multiplexing port of the L first wavelength division multiplexers/demultiplexers by the beam generation apparatus, and then the first optical switch inputs the received laser light to the demultiplexing ports of the L second wavelength division multiplexers/demultiplexers. Then, any second wavelength division multiplexer/demultiplexer that receives the laser light and that is in the L second wavelength division multiplexers/demultiplexers sends the received laser light through a remaining multiplexing port of the second wavelength division multiplexer/demultiplexer to the detection apparatus, so that the detection apparatus obtains an output power of the output laser light. In comparison with the conventional technology, the optical switching apparatus provided in this embodiment of this application can still obtain the output power of the laser light when there is no signal light, so as to obtain an insertion loss of the first optical switch based on an input power of the laser light and the output power of the laser light. In this way, in scenarios of channel closed-loop, power-on self-test, and unused-channel detection, the insertion loss of the first optical switch can still be obtained even if there is no service light on the channel.

Optionally, the first optical switch 201 in this embodiment of this application is configured to establish and switch a pass-through channel, a wavelength-adding channel, and a wavelength-dropping channel.

It should be understood that, in this embodiment of this application, signal light and detection light that have a same wavelength are output through different demultiplexing ports. However, when the wavelength of the signal light and the wavelength of the detection light satisfy a specific relationship, the signal light and the detection light that have the same wavelength may be input through different multiplexing ports, and output through a same demultiplexing port.

Generally, detection light with different wavelengths may be input through a same multiplexing port or through different multiplexing ports. Signal light with different wavelengths may be input through a same signal light port.

For example, the first wavelength division multiplexer/demultiplexer 202 has three multiplexing ports. If a multiplexing port 1 is a signal light port, and a multiplexing port 2 and a multiplexing port 3 are detection light ports, signal light with a wavelength of $\lambda_1$, signal light with a wavelength of $\lambda_2$, signal light with a wavelength of $\lambda_3$, . . . , and signal light with a wavelength of may be input through the multiplexing port 1. Detection light with a wavelength of $\lambda'_1$ and detection light with a wavelength of $\lambda'_2$ are input through the multiplexing port 2, detection light with a wavelength of $\lambda'_3$, . . . , and detection light with a wavelength of $\lambda'_N$ are input through the multiplexing port 3. Alternatively, detection light with a wavelength of $\lambda'_1$, detection light with a wavelength of $\lambda'_2$, detection light with a wavelength of $\lambda'_3$, . . . , and detection light with a wavelength of $\lambda'_N$ are input through the multiplexing port 3 or the multiplexing port 2.

Figure 7:
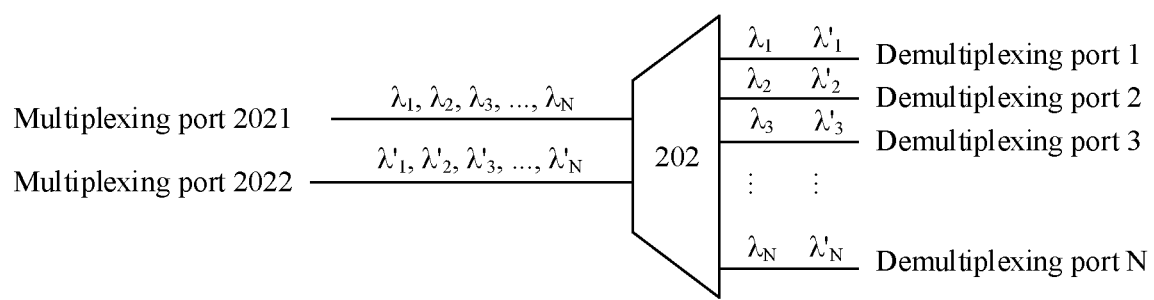

For example, as shown in FIG. 7, the signal light with the wavelength of $\lambda_1$, the signal light with the wavelength of $\lambda_2$, the signal light with the wavelength of $\lambda_3$, . . . , and the signal light with the wavelength of are input through the multiplexing port 2021 of the first wavelength division multiplexer/demultiplexer 202. The detection light with the wavelength of $\lambda'_1$, the detection light with the wavelength of $\lambda'_2$, the detection light with the wavelength of $\lambda'_3$, . . . , and the detection light with the wavelength of $\lambda'_N$ are input through the multiplexing port 2022 of the first wavelength division multiplexer/demultiplexer 202. Then, the signal light with the wavelength of $\lambda_1$ and the detection light with the wavelength of $\lambda'_1$ are output through the demultiplexing port 1. The signal light with the wavelength of $\lambda_2$ and the detection light with the wavelength of $\lambda'_2$ are output through the demultiplexing port 2. The signal light with the wavelength of $\lambda 3$ and the detection light with the wavelength of $\lambda'_3$ are output through the demultiplexing port 3. The signal light with the wavelength of and the detection light with the wavelength of $\lambda'_N$ are output through a demultiplexing port N.

It should be understood that, in FIG. 7, in this embodiment of this application, signal light with a wavelength of $\lambda_4$ is input through a demultiplexing port i, and may be output through the multiplexing port 2021. A power of signal light output through the multiplexing port 2022 is very small (crosstalk light) or there is no signal light. The signal light with the wavelength of $\lambda_4$ is input through a demultiplexing port j ($j\neq i$), and a power of light output through the multiplexing port 2021 is very small (crosstalk light) or there is no light.

Detection light with a wavelength of $\lambda'_i$ is input through the demultiplexing port i, and may be output through the multiplexing port 2022. A power of the detection light output through the multiplexing port 2021 is very small (crosstalk light) or there is no detection light. The detection light with the wavelength of $\lambda'_i$ is input through the demultiplexing port j ($j\neq i$), and a power of light output through the multiplexing port 2032 is very small (crosstalk light) or there is no detection light. j is 1, . . . , or N. The wavelength division multiplexer/demultiplexer is a wavelength-related component that is made according to a principle of interference. Only laser light with a specific wavelength can pass through a transmission path from a multiplexing port to a demultiplexing port. Similarly, only laser light with a specific wavelength can pass through a transmission path from a demultiplexing port to a multiplexing port.

According to the foregoing relationship, it is clear that $\lambda_i$ and $\lambda'_i$ cannot be the same. However, a set from $\lambda_1$ to may be the same as or different from a set from $\lambda'_1$ to $\lambda'_N$.

It should be noted that, in this embodiment of this application, one multiplexing port and one demultiplexing port may form one transmission path. In other words, if there are X multiplexing ports and Y demultiplexing ports, X*Y transmission paths may be formed. One demultiplexing port and a multiplexing port that serves as a signal light port may form a transmission path, or one demultiplexing port and a multiplexing port that serves as a detection light port may form a transmission path. For example, in FIG. 7, the multiplexing port 2021 and the demultiplexing port 1 and the multiplexing port 2022 and the demultiplexing port 1 form two transmission paths. In this case, the signal light with the wavelength of $\lambda_1$ input through the multiplexing port 2021 and the detection light with the wavelength of $\lambda'_1$ input through the multiplexing port 2022 may separately be output through the demultiplexing port 1.

Figure 8:
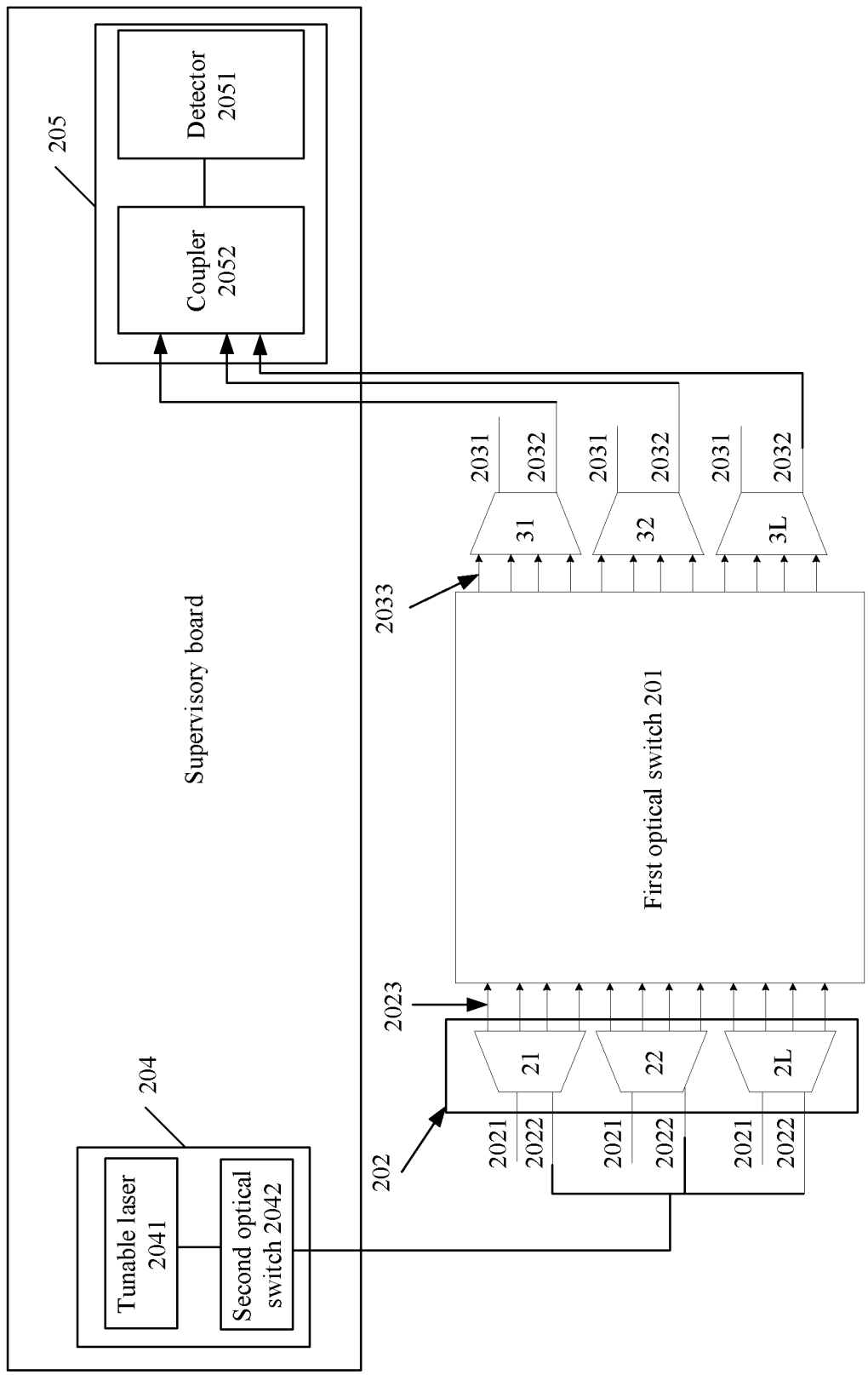

In a first optional implementation, the L first wavelength division multiplexers/demultiplexers 202 may share one beam generation apparatus 204. In this case, as shown in FIG. 8, the beam generation apparatus 204 in this embodiment of this application includes a tunable laser (TL) 2041 and a second optical switch 2042.

The second optical switch 2042 is connected to both the tunable laser 2041 and the remaining multiplexing port of the first wavelength division multiplexer/demultiplexer 202, and is configured to switch laser light, output by the tunable laser 2041, to a target multiplexing port of the first wavelength division multiplexer/demultiplexer 202.

It should be understood that the second optical switch 2042 is configured to select a first wavelength division multiplexer/demultiplexer 202 in the L first wavelength division multiplexers/demultiplexers 202 to which laser light generated by the tunable laser 2041 is to be switched. That is, the second optical switch 2042 is configured to select a first wavelength division multiplexer/demultiplexer 202 in the L first wavelength division multiplexers/demultiplexers 202, where laser light that is generated by the tunable laser 2041 and that has a same wavelength is sequentially input to the selected first wavelength division multiplexer/demultiplexer 202.

For example, the second optical switch 2042 may be a 1*T coupler or a 1*T optical switch, where T is a positive integer.

It should be understood that, when the second optical switch 2042 is the 1*T coupler, the second optical switch 2042 may sequentially input laser light that has different wavelengths to the first wavelength division multiplexer/demultiplexer 202 by using a second example described below.

For example, when the L first wavelength division multiplexers/demultiplexers 202 may share one beam generation apparatus 204, in one aspect, in this embodiment of this application, the tunable laser 2041 generates laser light with one wavelength each time, and then the second optical switch 2042 sequentially inputs the laser light that has the same wavelength and that is generated by the tunable laser 2041 each time to the L first wavelength division multiplexers/demultiplexers 202. Alternatively, in another aspect, the second optical switch 2042 is adjusted, so that the second optical switch 2042 is first switched to the multiplexing port 2022 of the first wavelength division multiplexer/demultiplexer 202, and in this case, the tunable laser 2041 generates detection light with wavelengths from $\lambda'_1$ to $\lambda'_N$. Then the detection light with the wavelengths from $\lambda'_1$ to $\lambda'_N$ is sequentially input to the multiplexing port 2022 of the first wavelength division multiplexer/demultiplexer 202 to which the second optical switch 2042 is switched.

In a first example, in a working process of the beam generation apparatus 204, that the generated laser light is detection light is used as an example, and the tunable laser 2041 generates the detection light with the wavelength of $\lambda'_1$. The second optical switch 2042 switches the detection light with the wavelength of $\lambda'_1$ to a multiplexing port 2022 of the first wavelength division multiplexer/demultiplexer 21, then switches the detection light with the wavelength of $\lambda'_1$ to a multiplexing port 2022 of the first wavelength division multiplexer/demultiplexer 22, . . . , and switches the detection light with the wavelength of $\lambda'_1$ to a multiplexing port 2022 of the first wavelength division multiplexer/demultiplexer 2L. If the beam generation apparatus 204 further generates the detection light with the wavelength of $\lambda'_2$, the second optical switch 2042 sequentially switches the detection light with the wavelength of $\lambda'_2$ to the first wavelength division multiplexer/demultiplexer 21, . . . , and the first wavelength division multiplexer/demultiplexer 2L. That is, an objective of the second optical switch 2042 is to sequentially switch detection light that has any wavelength and that is generated by the beam generation apparatus 204 to the L first wavelength division multiplexers/demultiplexers 202.

In the second example, the second optical switch 2042 is first adjusted, so that the second optical switch 2042 is switched to the multiplexing port 2022 of the first wavelength division multiplexer/demultiplexer 21, and then the tunable laser 2041 sequentially generates the detection light with the wavelengths from $\lambda'_1$ to $\lambda'_N$. Because the second optical switch 2042 is switched to the multiplexing port 2022 of the first wavelength division multiplexer/demultiplexer 21, in this case, the detection light that has the wavelengths from $\lambda'_1$ to $\lambda'_N$ and that is generated by the tunable laser 2041 is sequentially input to the multiplexing port 2022 of the first wavelength division multiplexer/demultiplexer 21. Then, the second optical switch 2042 is adjusted, so that the second optical switch 2042 is switched to the multiplexing port 2022 of the first wavelength division multiplexer/demultiplexer 22, and then the tunable laser 2041 sequentially generates the detection light with the wavelengths from $\lambda'_1$ to $\lambda'_N$. Because the second optical switch 2042 is switched to the multiplexing port 2022 of the first wavelength division multiplexer/demultiplexer 22, in this case, the detection light that has the wavelengths from $\lambda'_1$ to $\lambda'_N$ and that is generated by the tunable laser 2041 is sequentially input to the multiplexing port 2022 of the first wavelength division multiplexer/demultiplexer 22. The rest can be deducted by analogy, and the detection light with the wavelengths from $\lambda'_1$ to $\lambda'_N$ is sequentially input to each first wavelength division multiplexer/demultiplexer in the L first wavelength division multiplexers/demultiplexers.

In a second optional implementation, the L second wavelength division multiplexers/demultiplexers 203 may share one detection apparatus 205. In this case, as shown in FIG. 8, the detection apparatus 205 further includes a detector 2051 and a coupler 2052. The coupler 2052 is connected to both the detector 2051 and the remaining multiplexing port of the second wavelength division multiplexer/demultiplexer 203, and is configured to couple, to the detector 2051, laser light output through the remaining multiplexing port of the second wavelength division multiplexer/demultiplexer.

It should be understood that the coupler 2052 sequentially couples, to the detector 2051, laser light output through a remaining multiplexing port of each second wavelength division multiplexer/demultiplexer 203 in the L second wavelength division multiplexers/demultiplexers 203.

For example, if the coupler 2052 first receives laser light output through a remaining multiplexing port of a second wavelength division multiplexer/demultiplexer 203, the coupler 2052 first couples, to the detector 2051, the laser light output through the remaining multiplexing port of the second wavelength division multiplexer/demultiplexer 203, so that the detector 2051 may detect an output power of the laser light output through the remaining multiplexing port of each second wavelength division multiplexer/demultiplexer 203.

It should be understood that the detector 2051 is configured to obtain an output power of laser light of each wavelength in laser light that has different wavelengths and that is output through the remaining multiplexing port of each second wavelength division multiplexer/demultiplexer 203.

For example, if the second wavelength division multiplexer/demultiplexer 31 outputs laser light with a wavelength of $\lambda'_1$, the coupler 2052 couples the laser light with the wavelength of $\lambda'_1$ to the detector 2051, and the detector 2051 detects an output power of the laser light with the wavelength of $\lambda'_1$. If the second wavelength division multiplexer/demultiplexer 31 outputs laser light with a wavelength of $\lambda'_2$, the coupler 2052 couples the laser light with the wavelength of $\lambda'_2$ to the detector 2051, and the detector 2051 detects an output power of the laser light with the wavelength of $\lambda'_2$.

For example, the coupler 2052 may be a 1*T optical switch or a 1*T coupler.

It should be understood that, in this embodiment of this application, an optical switch with 1*a plurality of ports may be replaced with a coupler with a same quantity of ports based on a system feature and a detection requirement. The coupler with 1*a plurality of ports may be replaced with an optical switch with a same quantity of ports based on a system feature and a detection requirement. However, if a coupler is used in the detection apparatus, the second optical switch in the beam generation apparatus 204 needs to be a 1*T optical switch. For example, the coupler 2052 may be a 1*T optical switch, and the second optical switch may be a 1*T optical switch. The coupler 2052 may be a 1*T coupler, and the second optical switch may be a 1*T optical switch. The coupler 2052 may be a 1*T optical switch, and the second optical switch may be a 1*T coupler.

Optionally, as shown in FIG. 8, in this embodiment of this application, when the L first wavelength division multiplexers/demultiplexers 202 share one beam generation apparatus 204, and the L second wavelength division multiplexers/demultiplexers 203 share one detection apparatus 205, the tunable laser 2041, the second optical switch 2042, the coupler 2052, and the detector 2051 in this embodiment of this application may be made into an independent detection board.

Specifically, when the optical switching apparatus uses a structure shown in FIG. 8, an insertion loss of signal light with a wavelength of $\lambda_i$ on a pass-through channel in the first optical switch may be detected. For example, the 1*T second optical switch 2042 of an output port of the tunable laser 2041 is first controlled to be switched to a multiplexing port 2022 of any first wavelength division multiplexer/demultiplexer 202 (the first wavelength division multiplexer/demultiplexer 21 is used as an example), so that the tunable laser 2041 is connected to the multiplexing port 2022 of the first wavelength division multiplexer/demultiplexer 21. Then, the tunable laser 2041 is adjusted to output detection light with a wavelength of $\lambda'_i$. According to a pass-through channel detection principle described in FIG. 3, after the detection light with the wavelength of $\lambda'_i$ is input to the multiplexing port 2022 of the first wavelength division multiplexer/demultiplexer 21, the detection light with the wavelength of $\lambda'_i$ is input to the first optical switch 201 through one demultiplexing port of the first wavelength division multiplexer/demultiplexer 21. Then, the first optical switch 201 selects one second wavelength division multiplexer/demultiplexer (the second wavelength division multiplexer/demultiplexer 32 is used as an example). The detection light with the wavelength of $\lambda'_i$ enters the second wavelength division multiplexer/demultiplexer 32 through one demultiplexing port of the second wavelength division multiplexer/demultiplexer 32, is output through a multiplexing port 2032 of the second wavelength division multiplexer/demultiplexer 32, and enters the detector 2051 after passing through the 1*T coupler 2052. Then, the detector 2051 detects an output power of the received detection light with the wavelength of $\lambda'_i$. Finally, based on the output power of the detection light with the wavelength of $\lambda'_i$ and an input power of the detection light with the wavelength of $\lambda'_i$, an insertion loss 1 of the detection light with the wavelength of $\lambda'_i$ on the pass-through channel may be calculated. By subtracting an insertion loss of components, other than the first optical switch, through which the detection light with the wavelength of $\lambda'_i$ passes on a trail (that is, from the first wavelength division multiplexer/demultiplexer 21 to the detector 2051) of the pass-through channel from the insertion loss 1 of the detection light with the wavelength of $\lambda'_i$ on the pass-through channel, an insertion loss of the detection light with the wavelength of $\lambda'_i$ in the first optical switch can be obtained. It may be approximately considered that the insertion loss of the detection light with the wavelength of $\lambda'_i$ in the first optical switch is the insertion loss of the signal light with the wavelength of $\lambda_i$ on the pass-through channel in the first optical switch.

It should be understood that the second optical switch 2042 may switch the detection light with the wavelength of $\lambda'_i$ to different first wavelength division multiplexers/demultiplexers 202, so that the detector 2051 obtains output powers of the detection light with different wavelengths on the pass-through channel.

Figure 9:
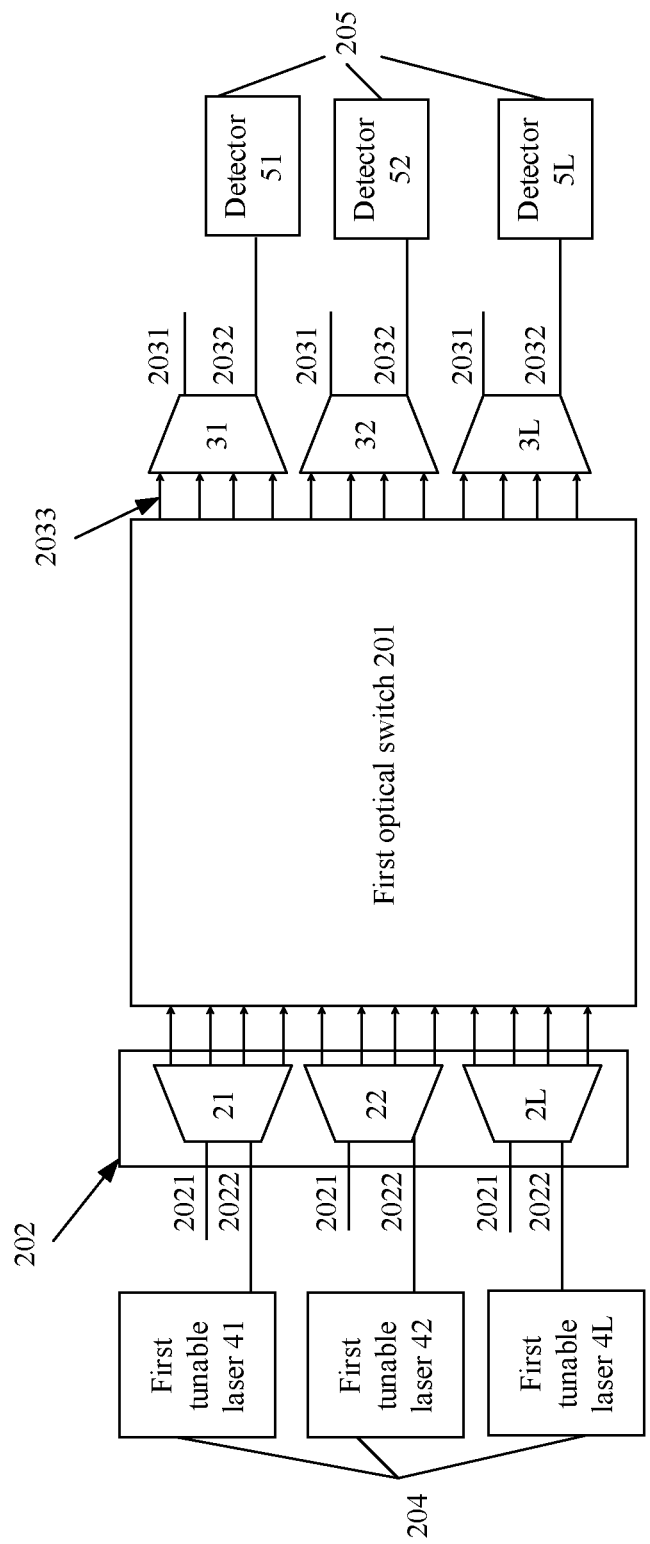

In another optional implementation, to flexibly control laser light input to each first wavelength division multiplexer/demultiplexer 202 in the L first wavelength division multiplexers/demultiplexers 202, one first tunable laser may be configured for each first wavelength division multiplexer/demultiplexer 202. As shown in FIG. 9, a difference between FIG. 9 and FIG. 8 is: The beam generation apparatus 204 includes a plurality of first tunable lasers (for example, the beam generation apparatus 204 includes L first tunable lasers, and a first tunable laser 41, a first tunable laser 42, . . . , and a first tunable laser 4L are used as an example.) Each first tunable laser in the plurality of first tunable lasers is connected to one multiplexing port other than the signal light port of the L first wavelength division multiplexers/demultiplexers.

For example, as shown in FIG. 9, the first tunable laser 41 is connected to the multiplexing port 2022 of the first wavelength division multiplexer/demultiplexer 21. The first tunable laser 42 is connected to the multiplexing port 2022 of the first wavelength division multiplexer/demultiplexer 22. The first tunable laser 4L is connected to the multiplexing port 2022 of the first wavelength division multiplexer/demultiplexer 2L.

In a structure shown in FIG. 9, any first tunable laser is configured to sequentially generate laser light with different wavelengths, and then sequentially input the laser light with different wavelengths to a first wavelength division multiplexer/demultiplexer 202 connected to the first tunable laser.

For example, in FIG. 9, the first tunable laser 41 is configured to sequentially generate detection light with wavelengths from $\lambda'_1$ to $\lambda'_N$, so that the first wavelength division multiplexer/demultiplexer connected to the first tunable laser 41 can sequentially receive the detection light with the wavelengths from $\lambda'_1$ to $\lambda'_N$.

Further optionally, to accurately obtain an output power of laser light output by each second wavelength division multiplexer/demultiplexer 203 in the L second wavelength division multiplexers/demultiplexers 203, one detector may be configured for each second wavelength division multiplexer/demultiplexer 203. In this case, the detection apparatus 205 includes a plurality of detectors. For example, as shown in FIG. 9, a detector 51, a detector 52, . . . , and a detector 5L are included. As shown in FIG. 9, each detector in the plurality of detectors is connected to one multiplexing port other than a signal light port of a second wavelength division multiplexer/demultiplexer.

The detector in the embodiments of this application may be a photodetector (PD).

For example, as shown in FIG. 9, a multiplexing port 2032 of the second wavelength division multiplexer/demultiplexer 31 is connected to the detector 51. The multiplexing port 2032 of the second wavelength division multiplexer/demultiplexer 32 is connected to the detector 52. A multiplexing port 2032 of the second wavelength division multiplexer/demultiplexer 3L is connected to the detector 5L.

It should be understood that any detector in FIG. 9 is configured to detect an output power of laser light of each wavelength in laser light that has different wavelengths and that is output by a second wavelength division multiplexer/demultiplexer connected to the detector.

It should be noted that, in this embodiment of this application, the optical switching apparatus in any one of the accompanying drawings FIG. 6 to FIG. 9 may calculate an output power of laser light output on the pass-through channel. When pass-through channel detection is implemented, a transmission direction of signal light input through a signal light port of any first wavelength division multiplexer/demultiplexer 202 in the L first wavelength division multiplexers/demultiplexers 202 is the same as or may be opposite to a transmission direction of detection light input through a remaining multiplexing port. When the optical switching apparatus may calculate the output power of the laser light output on the pass-through channel, the beam generation apparatus 204 provides laser light with a wavelength of $\lambda'_i$ to any first wavelength division multiplexer/demultiplexer 202. The laser light with the wavelength of $\lambda'_i$ enters the any first wavelength division multiplexer/demultiplexer 202 through a multiplexing port 2022 of the any first wavelength division multiplexer/demultiplexer 202, and then is input to the first optical switch 201 through a demultiplexing port of the any first wavelength division multiplexer/demultiplexer 202. After the first optical switch 201 selects one second wavelength division multiplexer/demultiplexer 203 for the laser light with the wavelength of $\lambda'_i$, the laser light with the wavelength of $\lambda'_i$ is input to a demultiplexing port of the selected second wavelength division multiplexer/demultiplexer 203, and enters the second wavelength division multiplexer/demultiplexer 203. Then, the laser light with the wavelength of $\lambda'_i$ is output through a multiplexing port 2032 of the second wavelength division multiplexer/demultiplexer 203 to the detection apparatus 205.

Specifically, when the optical switching apparatus uses the structure shown in FIG. 9, a difference between the structure in which an insertion loss of signal light with a wavelength of $\lambda_i$ on the pass-through channel is calculated and the structure shown in FIG. 8 is: The first tunable laser 41 is used as an example. The first tunable laser 41 in FIG. 9 is configured to input detection light with a wavelength of $\lambda'_i$ to a multiplexing port 2022 of a first wavelength division multiplexer/demultiplexer 21 connected to the first tunable laser 41. According to a pass-through channel detection principle described in FIG. 3, the first wavelength division multiplexer/demultiplexer 21 that receives the detection light with the wavelength of $\lambda'_i$ inputs the detection light with the wavelength of $\lambda'_i$ through a demultiplexing port 2023 to the first optical switch 201. After selecting one second wavelength division multiplexer/demultiplexer (for example, the second wavelength division multiplexer/demultiplexer 32), the first optical switch 201 inputs the detection light with the wavelength of $\lambda'_i$ to a demultiplexing port 2033 of the selected second wavelength division multiplexer/demultiplexer 32. Then, the detection light with the wavelength of $\lambda'_i$ is output through the multiplexing port 2032 of the second wavelength division multiplexer/demultiplexer 32, and is received by the detector 52 connected to the second wavelength division multiplexer/demultiplexer 32. The detector 52 detects an output power of the received detection light with the wavelength of $\lambda'_i$. In this way, based on an input power that is of the detection light with the wavelength of $\lambda'_i$ and that is provided by the first tunable laser 41 and the output power of the detection light with the wavelength of $\lambda'_i$, an insertion loss 1 of the detection light with the wavelength of $\lambda'_i$ on the pass-through channel may be calculated. By subtracting an insertion loss of components, other than the first optical switch, through which the detection light with the wavelength of $\lambda'_i$ passes on an optical path in FIG. 9 from the insertion loss 1, an insertion loss of the detection light with the wavelength of $\lambda'_i$ on the pass-through channel in the first optical switch can be obtained. Because the insertion loss of the first optical switch is insensitive to a wavelength, it may be approximately considered that the insertion loss of the detection light with the wavelength of $\lambda'_i$ on the pass-through channel in the first optical switch is the insertion loss of the signal light with the wavelength of $\lambda_i$ on the pass-through channel in the first optical switch. Alternatively, it may be considered that the insertion loss 1 of the detection light with the wavelength of $\lambda'_i$ on the pass-through channel is the insertion loss of the signal light with the wavelength of $\lambda_i$ on the pass-through channel.

Optionally, to implement insertion loss detection on a wavelength-adding channel or a wavelength-dropping channel, the first optical switch 201 provided in this embodiment of this application further includes M first tributary ports 206, and the optical switching apparatus further includes a third optical switch 2043. The third optical switch 2043 is connected to both the beam generation apparatus 204 and the M first tributary ports 206, where M is a positive integer.

Figure 10:
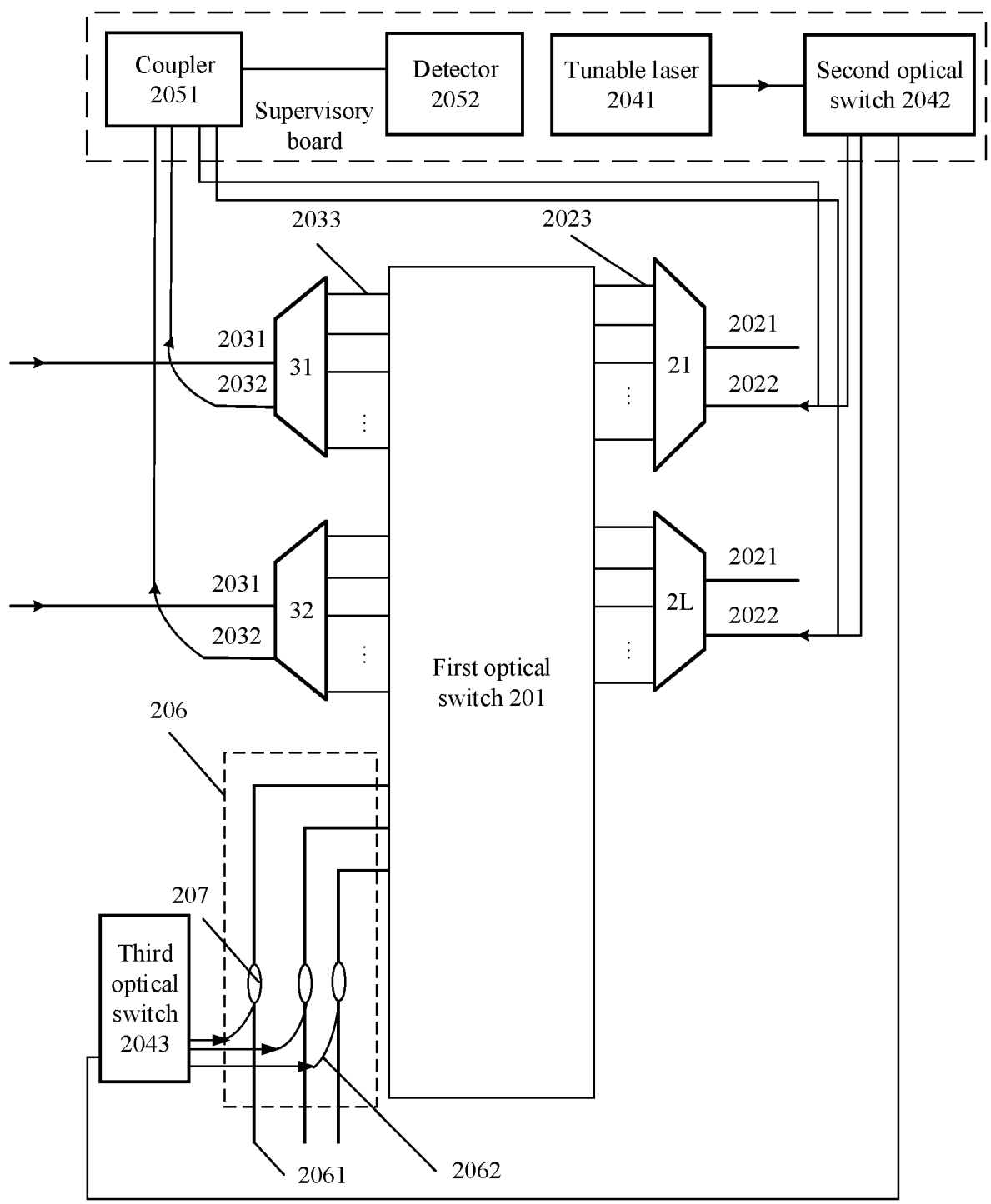

For example, in a structure shown in FIG. 10, the third optical switch 2043 is connected to both the second optical switch 2042 and the M first tributary ports 206. The beam generation apparatus 204 is configured to provide laser light for the M first tributary ports 206.

For example, the third optical switch 2043 is a 1*M optical switch or a 1*M coupler.

During wavelength-adding channel detection, the second optical switch 2042 is configured to switch laser light from the tunable laser 2041 to the third optical switch 2043. The third optical switch 2043 is configured to select a first tributary port in the M first tributary ports 206, where the laser light from the tunable laser 2041 is input to the selected first tributary port. Finally, laser light that has different wavelengths and that is generated by the tunable laser 2041 is sequentially input to each first tributary port.

It should be understood that, for example, the third optical switch 2043 is a 1*M coupler, and if the tunable laser 2041 sequentially generates detection light with wavelengths from $\lambda'_1$ to $\lambda'_N$, the third optical switch 2043 may sequentially input the detection light with the wavelengths from $\lambda'_1$ to $\lambda'_N$ to a same first tributary port. In this case, the third optical switch 2043 is first switched to one first tributary port, and after the detection light with the wavelengths from $\lambda'_1$ to $\lambda'_N$ is input to the first tributary port, the third optical switch 2043 is switched to another first tributary port. Then, the detection light that has the wavelengths from $\lambda'_1$ to $\lambda'_N$ and that is sequentially generated by the tunable laser 2041 is input to the another first tributary port.

If the tunable laser 2041 inputs detection light that has a same wavelength each time, the third optical switch 2043 may sequentially input the detection light that has the same wavelength to the M first tributary ports 206.

It should be noted that the M first tributary ports 206 may be located on a same tributary board, or may be located on a plurality of tributary boards. When the M first tributary ports 206 are located on a same tributary board, to reduce costs and a volume of the optical switching apparatus, the M first tributary ports 206 may share one third optical switch 2043.

When the M first tributary ports 206 are located on a plurality of tributary boards, a sum of quantities of first tributary ports 206 distributed on the plurality of tributary boards is equal to M. For example, a quantity of the plurality of tributary boards is P, and a quantity of first tributary ports 206 distributed on each tributary board is Q. It should be understood that quantities of first tributary ports 206 on different tributary boards may be the same or may be different. However, it needs to be ensured that a sum of quantities of all first tributary ports 206 on the P tributary boards is M.

If the M first tributary ports 206 are located on the P tributary boards, and each tributary board includes Q first tributary ports 206, the P tributary boards may share one third optical switch 2043, or each tributary board may be connected to one optical switch. In this case, the third optical switch 2043 includes P optical switches 20431. Each of the P optical switches 20431 is connected to the beam generation apparatus 204 and one of the P tributary boards. The beam generation apparatus 204 is configured to input generated laser light to any optical switch 20431 in the P optical switches 20431. The optical switch 20431 that receives the laser light from the beam generation apparatus 204 is configured to select a first tributary port 206 on a tributary board connected to the optical switch 20431, where the received laser light is input to the selected first tributary port 206. In this case, the optical switch 20431 may be a 1*Q optical switch.

It should be understood that the M first tributary ports 206 may share one first beam generation apparatus. Certainly, each M first tributary port 206 in the M first tributary ports 206 may alternatively be connected to one tunable laser. The L first wavelength division multiplexers/demultiplexers share one second beam generation apparatus. The second beam generation apparatus and the first beam generation apparatus are different beam generation apparatuses. It should be understood that, in FIG. 10, for example, the second beam generation apparatus and the first beam generation apparatus are a same beam generation apparatus. In other words, the M first tributary ports 206 and the L first wavelength division multiplexers/demultiplexers 202 share one beam generation apparatus 204.

To flexibly input laser light to the M first tributary ports 206, in this embodiment of this application, one second tunable laser 207 may be further configured for the M first tributary ports 206. In this case, in a structure shown in FIG. 11, the optical switching apparatus in this embodiment of this application further includes a second tunable laser 208 and a fifth optical switch 209. The fifth optical switch 209 is connected to both the second tunable laser 208 and the M first tributary ports 206. The fifth optical switch 209 is configured to select a first tributary port 206 to which laser light from the second tunable laser 208 is switched.

Figure 11:
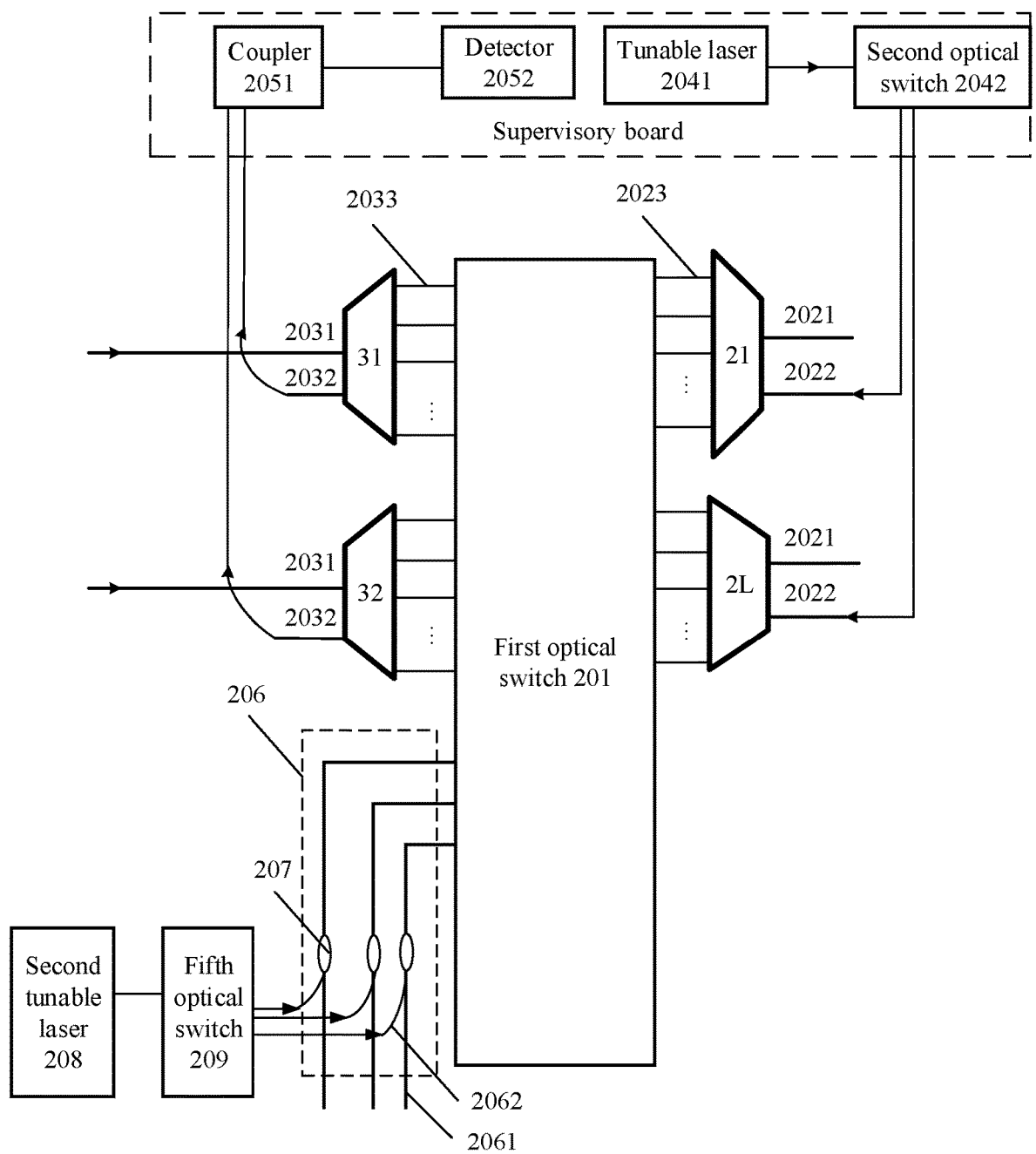
Figure 12:
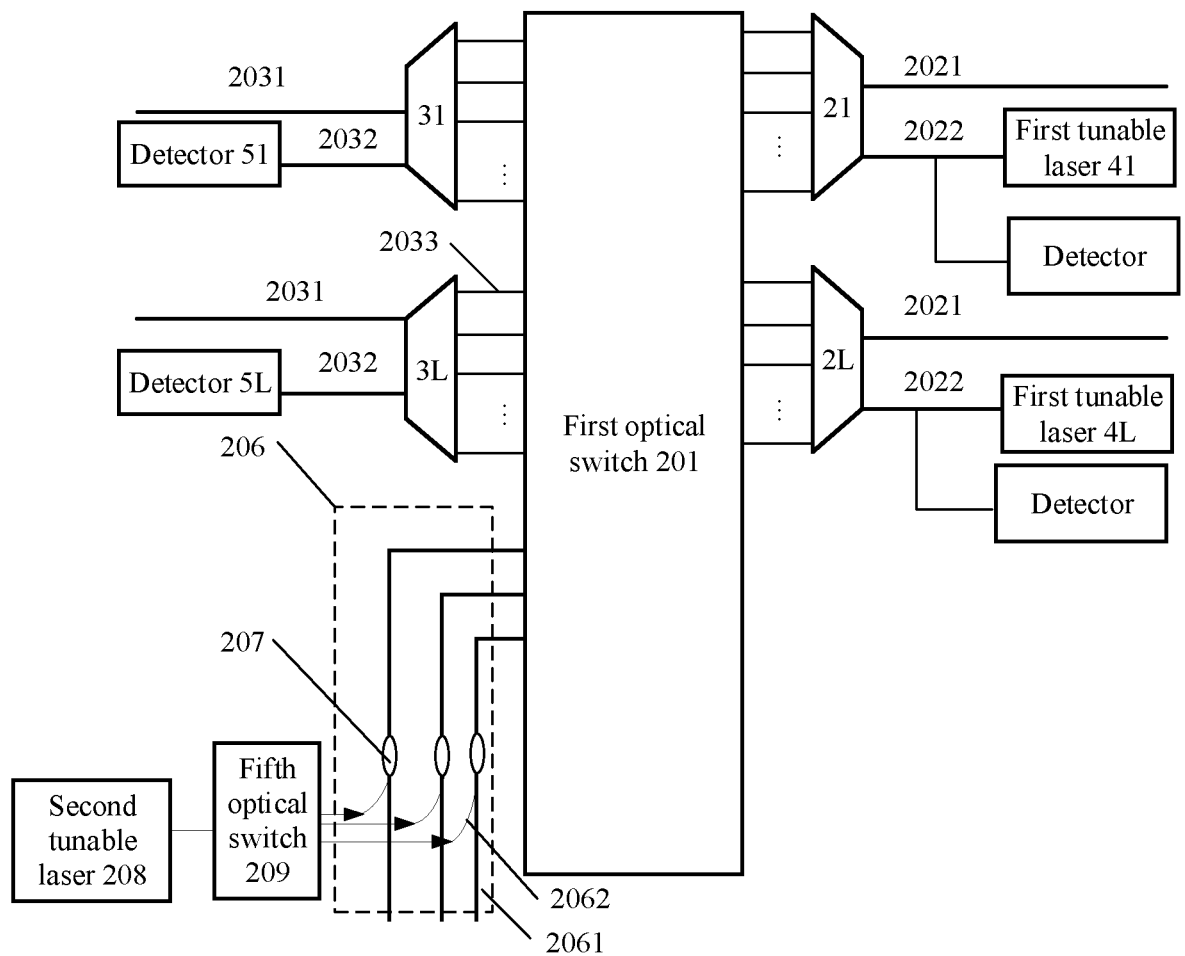

It should be understood that a difference between FIG. 10 and FIG. 11 or FIG. 12 is: In FIG. 10, the M first tributary ports 206 and the L first wavelength division multiplexers/demultiplexers 202 share one beam generation apparatus. In FIG. 11, the M first tributary ports 206 provide laser light by using the second tunable laser 208, and the L first wavelength division multiplexers/demultiplexers 202 provide laser light by using a tunable laser. In FIG. 12, the M first tributary ports 206 provide laser light by using the second tunable laser 208, and each first wavelength division multiplexer/demultiplexer 202 in the L first wavelength division multiplexers/demultiplexers 202 provides laser light by using a connected first tunable laser.

Optionally, for the structure shown in FIG. 11 or a structure shown in FIG. 12, if the M first tributary ports 206 are located on P tributary boards, and each tributary board includes Q first tributary ports 206, for a structure of the fifth optical switch, refer to the structure of the third optical switch 2043, and details are not described herein again.

Optionally, in the structures shown in FIG. 10 to FIG. 12, each tributary port in the M first tributary ports has one optical splitter or one 1*2 coupler 207.

It should be understood that the optical splitter or the 1*2 coupler 207 that is connected in series to each tributary port is configured to couple detection light to an optical path.

For example, the optical splitter or the coupler 207 has a plurality of ports, one of the plurality of ports is a signal light port 2061, and a remaining port 2062 may be used as a detection light port. The remaining port 2062 is connected to the fifth optical switch 209 or the third optical switch 2043.

When there is signal light, the signal light enters the first optical switch through the signal light port 2061, and detection light enters the first optical switch through the remaining port 2062.

Specifically, when the optical switching apparatus uses the structure shown in FIG. 10, in addition to calculating the insertion loss of the signal light with the wavelength of $\lambda_i$ on the pass-through channel in the first optical switch, the optical switching apparatus may be further configured to calculate the insertion loss of the signal light with the wavelength of $\lambda_i$ on the wavelength-adding channel in the first optical switch. A 1*T second optical switch 2042 of an output port of the tunable laser 2041 and a 1*M third optical switch 2043 that corresponds to M first tributary ports of the wavelength-adding channel are first controlled, so that the output port of the tunable laser 2041 is connected to each optical splitter on the first tributary ports. Then, the tunable laser 2041 is adjusted, so that the tunable laser 2041 outputs detection light with a wavelength of $\lambda'_i$. According to a wavelength-adding channel detection principle described in FIG. 4, the detection light with the wavelength of $\lambda'_i$ is output through one multiplexing port other than a signal light port of one first wavelength division multiplexer/demultiplexer 202 (the first wavelength division multiplexer/demultiplexer 21 is used as an example) or one second wavelength division multiplexer/demultiplexer 203 (the second wavelength division multiplexer/demultiplexer 31 is used as an example) corresponding to the detected first tributary port 206. Then, the detection light with the wavelength of $\lambda'_i$ is coupled to a detector 2052 by a coupler 2051 connected to the first wavelength division multiplexer/demultiplexer 21 or the second wavelength division multiplexer/demultiplexer 31. The detector 2052 detects an output power of the received detection light with the wavelength of $\lambda'_i$. Then, a processor may calculate an insertion loss 1 of the detection light with the wavelength of $\lambda'_i$ on the entire wavelength-adding channel based on an input power of the detection light with the wavelength of $\lambda'_i$ and the output power of the detection light with the wavelength of $\lambda'_i$. By subtracting an insertion loss of components, other than the first optical switch, through which the detection light with the wavelength of $\lambda'_i$ passes on an optical path of the wavelength-adding channel from the insertion loss 1 of the detection light with the wavelength of $\lambda'_i$ on the entire wavelength-adding channel, an insertion loss of the detection light with the wavelength of $\lambda'_i$ in the first optical switch can be obtained. Because the first optical switch is insensitive to a wavelength, it may be approximately considered that the insertion loss of the detection light with the wavelength of $\lambda'_i$ in the first optical switch is an insertion loss of signal light with a wavelength of $\lambda_i$ on the wavelength-adding channel in the first optical switch. Alternatively, it may be considered that the insertion loss 1 of the detection light with the wavelength of $\lambda'_i$ on the entire wavelength-adding channel is an insertion loss of the signal light with the wavelength of $\lambda_i$ on the entire wavelength-adding channel.

Specifically, when the optical switching apparatus uses the structure shown in FIG. 11 or FIG. 12, a difference between a detection process of the insertion loss of the detection light with the wavelength of $\lambda'_i$ in the first optical switch and that in FIG. 10 is: A 1*M fifth optical switch 209 corresponding to a to-be-detected first tributary port is first controlled, so that an output port of the second tunable laser 208 is connected to a 1*2 coupler on the to-be-detected first tributary port. For a remaining process, refer to a process of how to detect the insertion loss of the detection light with the wavelength of $\lambda'_i$ in the first optical switch in FIG. 10, and details are not described herein again.

Optionally, when the structures shown in FIG. 10 to FIG. 12 include both a wavelength-adding channel and a pass-through channel, and when the M first tributary ports 206 correspond to the L first wavelength division multiplexers/demultiplexers 202, the optical switching apparatus further includes a plurality of circulators 210. A first port b of each circulator 210 in the plurality of circulators 210 is connected to the beam generation apparatus 204, a second port a of each circulator 210 is connected to one multiplexing port 2022 other than the signal light port of the first wavelength division multiplexer/demultiplexer 202, and a third port c of each circulator 210 is connected to the detection apparatus 205.

It should be understood that, on the wavelength-adding channel, the laser light with the wavelength of $\lambda'_i$ is input through any first tributary port 206 to the first optical switch 201. Then, after the first optical switch 201 selects one first wavelength division multiplexer/demultiplexer 202 or one second wavelength division multiplexer/demultiplexer 203, the first optical switch 201 inputs the laser light with the wavelength of $\lambda'_i$ to the first wavelength division multiplexer/demultiplexer 202 or a demultiplexing port with the wavelength of $\lambda'_i$ of the second wavelength division multiplexer/demultiplexer 203.

It should be understood that, that the M first tributary ports 206 correspond to the L first wavelength division multiplexers/demultiplexers 202 may mean that on the wavelength-adding channel, laser light output through any first tributary port 206 in the M first tributary ports 206 is output through a remaining multiplexing port 2022 of one of the L first wavelength division multiplexers/demultiplexers 202.

Figure 13:
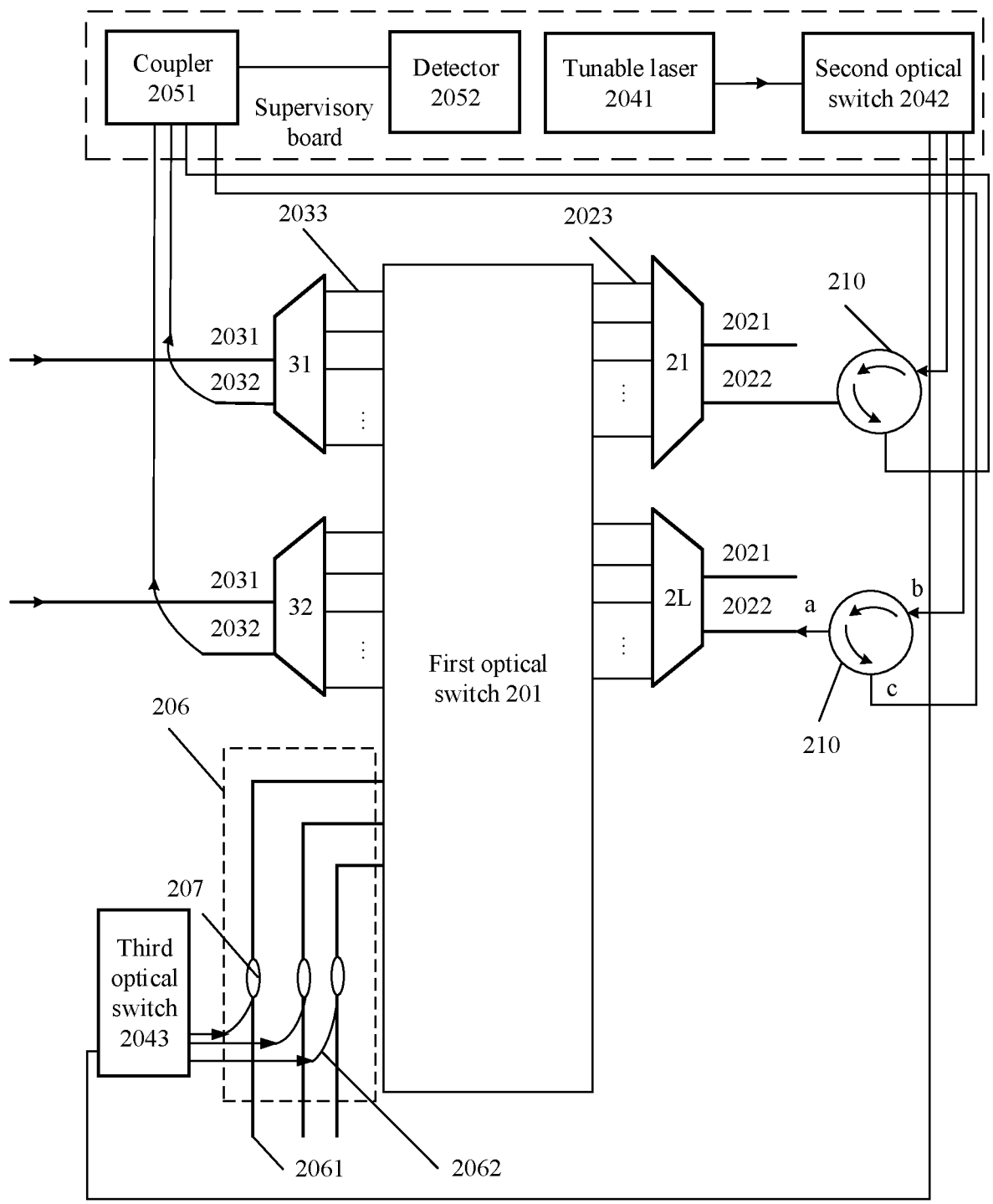
Figure 14:
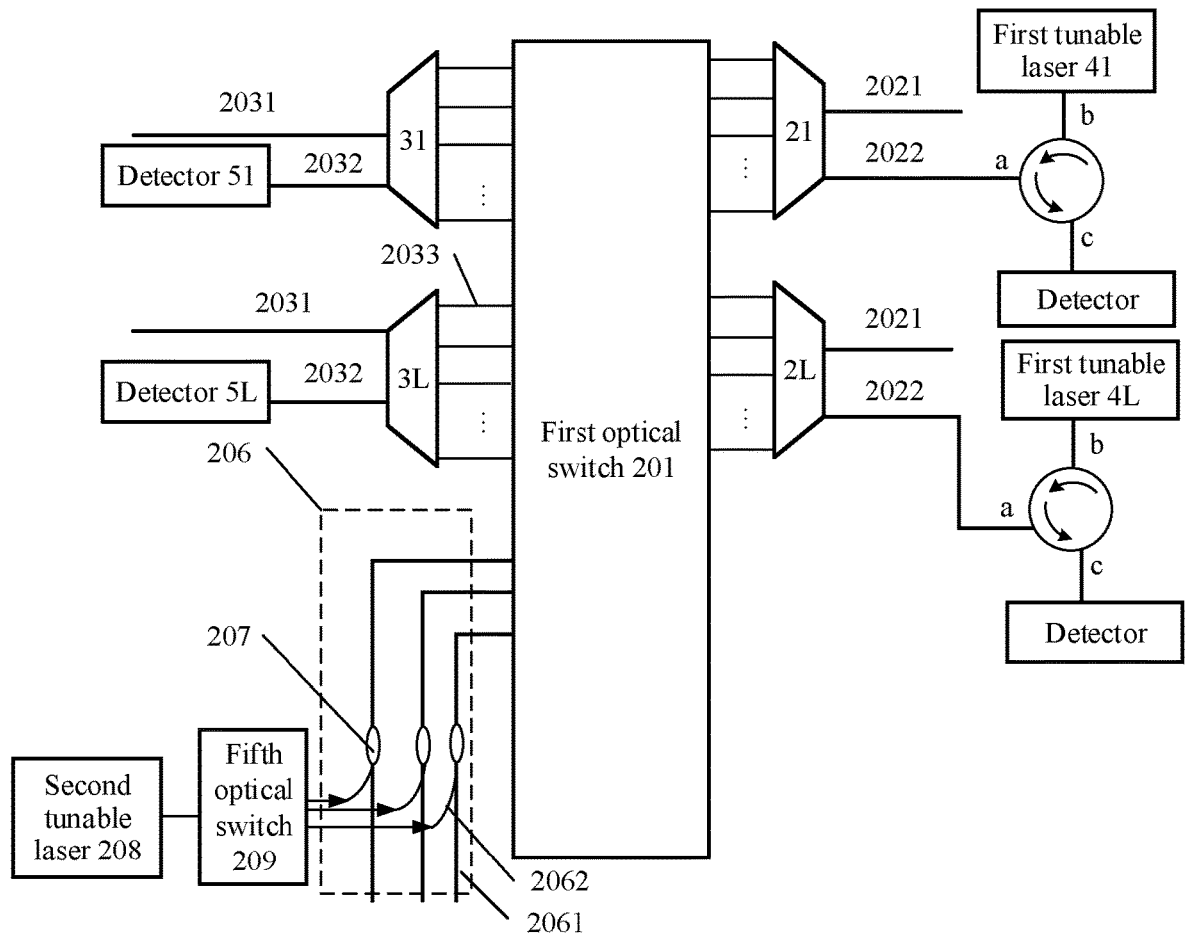

It should be understood that a difference between FIG. 13 and FIG. 14 is: In a structure shown in FIG. 13, the first port b of each circulator 210 is connected to the second optical switch 2042, and the third port c of each circulator 210 is connected to the coupler 2051. In a structure shown in FIG. 14, the detection apparatus 205 further includes L detectors, where each of the L detectors is connected to a third port c of one circulator 210, and the first port b of each circulator 210 is connected to a first tunable laser.

It should be noted that the circulator 210 may be an optical circulator. The circulator 210 is configured to separate laser light input to the first wavelength division multiplexer/demultiplexer 202 from laser light output from the first wavelength division multiplexer/demultiplexer 202.

It should be understood that a difference between a process in which the structure shown in FIG. 13 is used to detect the insertion loss of the detection light with the wavelength of $\lambda'_i$ in the first optical switch and that in FIG. 10 is: In FIG. 13, if one first wavelength division multiplexer/demultiplexer 202 receives the detection light with the wavelength of $\lambda'_i$, the detection light with the wavelength of $\lambda'_i$ is output through a multiplexing port other than a signal light port of the first wavelength division multiplexer/demultiplexer 202, enters the circulator 210 through the port a of the circulator, and then enters the coupler 2051 through the port c of the circulator 210. For a same part between FIG. 13 and FIG. 10, refer to the description in FIG. 10. Details are not described herein again.

A difference between a detection process in which the structure shown in FIG. 14 is used to detect the insertion loss of the detection light with the wavelength of $\lambda'_i$ in the first optical switch and that in FIG. 11 or FIG. 12 is: If one first wavelength division multiplexer/demultiplexer 202 receives the detection light with the wavelength of $\lambda'_i$, the detection light with the wavelength of $\lambda'_i$ is output through a multiplexing port other than a signal light port of the first wavelength division multiplexer/demultiplexer 202, enters the circulator 210 through the port a of the circulator, and then enters the detector through the port c of the circulator 210. For a same part between FIG. 14 and FIG. 11 or FIG. 12, refer to the description in FIG. 11. Details are not described herein again.

It should be noted that, when the structures shown in FIG. 10 to FIG. 12 include both a wavelength-adding channel and a pass-through channel, when the M first tributary ports 206 correspond to the L second wavelength division multiplexers/demultiplexers 203, or when the optical switching apparatus does not include a wavelength-adding channel, the circulator 210 may not be disposed on the optical switching apparatus.

Figure 15:
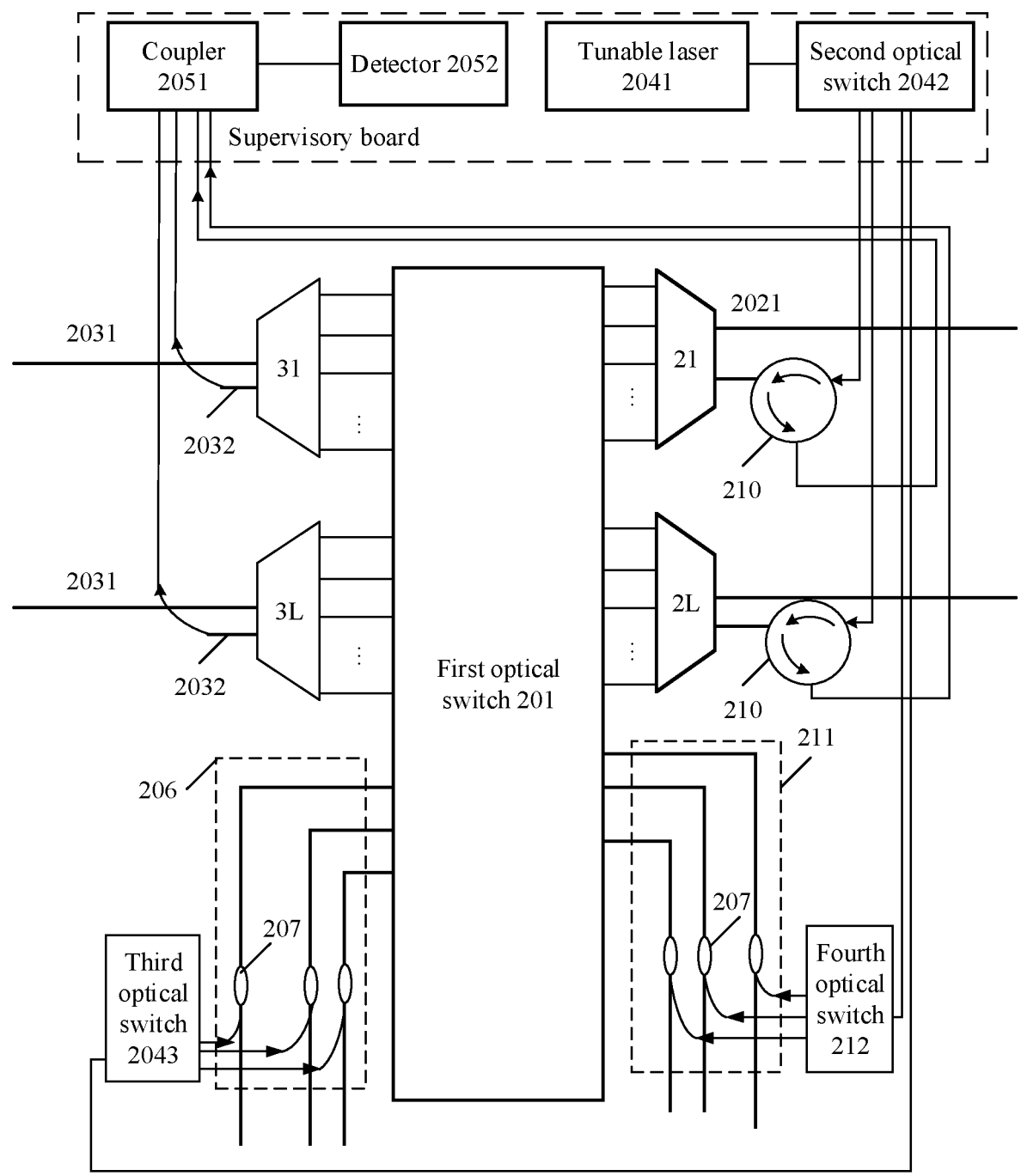
Figure 16:
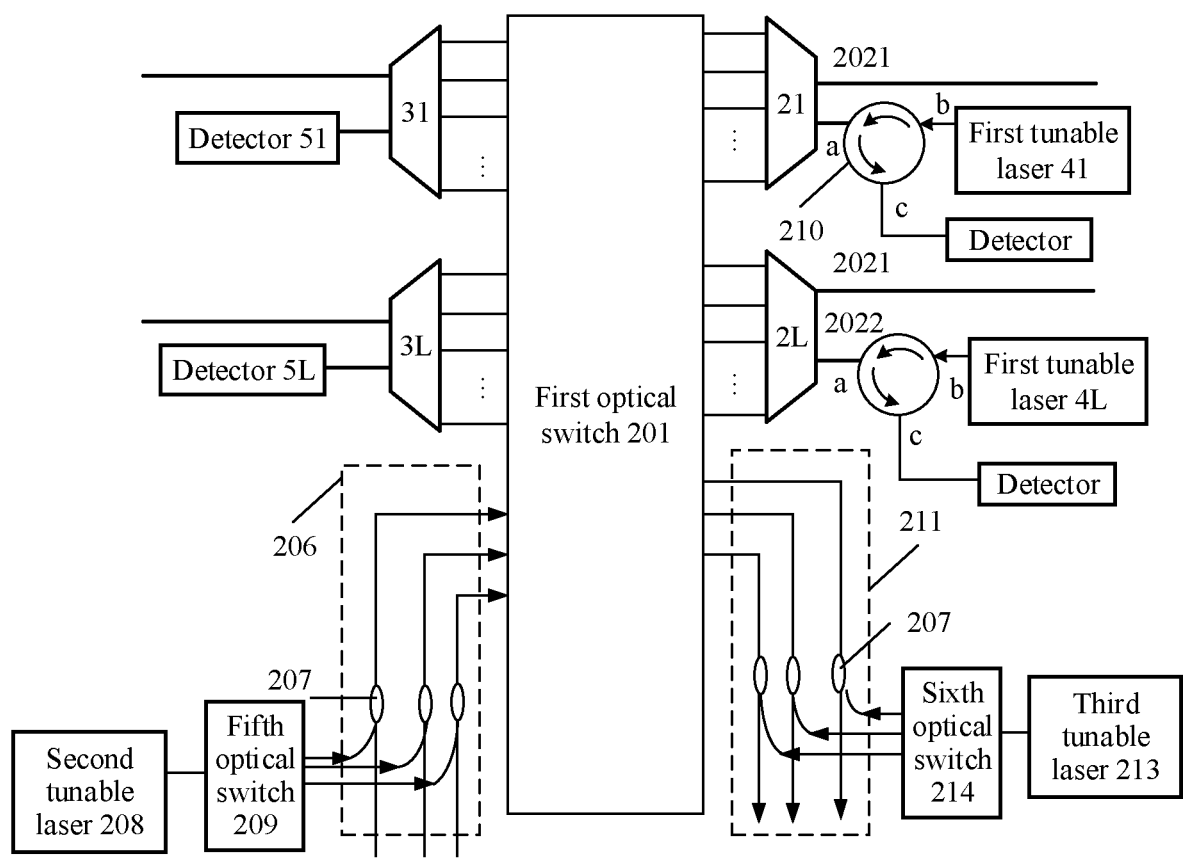

Optionally, in an optional embodiment, as shown in FIG. 15 or FIG. 16, the first optical switch 201 further includes N second tributary ports 211, and the optical switching apparatus further includes a fourth optical switch 212. The fourth optical switch 212 is connected to both the beam generation apparatus 204 and the N second tributary ports 211 of the first optical switch 201, where N is a positive integer.

The fourth optical switch 212 is a 1*N optical switch or coupler. It should be understood that a difference between FIG. 16 and FIG. 15 is: In FIG. 15, the N second tributary ports 211 and the L first wavelength division multiplexers/demultiplexers 202 share one beam generation apparatus. For example, the N second tributary ports 211 are connected to the second optical switch 2042 through the fourth optical switch 212. In FIG. 16, the optical switching apparatus may further include a third tunable laser 213 and a sixth optical switch 214. The sixth optical switch 214 is connected to the third tunable laser 213 and the N second tributary ports 211. The third tunable laser 213 is configured to provide laser light for the N second tributary ports 211. The N second tributary ports 211 are configured to select a second tributary port 211 that the laser light generated by the third tunable laser 213 enters.

It should be understood that, on a wavelength-dropping channel, because a transmission direction of signal light input to the first optical switch 201 and a transmission direction of detection light input to the first optical switch 201 need to be opposite, if the signal light is output through a second tributary port 211, the detection light needs to be input through the second tributary port 211. In this case, each second tributary port 211 is provided with laser light by the third tunable laser 213. For the wavelength-dropping channel, the detection light is transmitted from a tributary port to a line port, and the transmission direction of the detection light is opposite to the transmission direction of the signal light. Therefore, the second tributary port also needs to be connected to the third tunable laser 213 to input the detection light.

In this embodiment of this application, the sixth optical switch 214 may be a 1*N optical switch, and the fifth optical switch 209 may be a 1*M optical switch.

It should be understood that any second tributary port 211 in the N second tributary ports 211 is configured to form a wavelength-dropping channel with one of the L first wavelength division multiplexers/demultiplexers 202. Alternatively, any second tributary port 211 is configured to form a wavelength-dropping channel with one of the L second wavelength division multiplexers/demultiplexers 203.

It should be understood that, when both the wave-dropping channel and the wave-adding channel exist in the optical switching apparatus, the optical switching apparatus may include both N second tributary ports and M first tributary ports. Alternatively, a part of M first tributary ports are used as wavelength-adding ports, and the other part of the M first tributary ports are used as wavelength-dropping ports. In this case, N second tributary ports may not be disposed. Alternatively, when the wavelength-dropping channel and the wavelength-adding channel do not exist at a same time in the optical switching apparatus, M first tributary ports may be used as wave-adding ports when the wave-adding channel exists. The M first tributary ports are used as wavelength-dropping ports when the wavelength-dropping channel exists. In this case, N second tributary ports may not be disposed.

Optionally, in this embodiment of this application, an optical splitter 207 may be connected in series to each second tributary port.

A process in which a structure shown in FIG. 15 is used to detect an insertion loss of the signal light with the wavelength of $\lambda_i$ in the first optical switch may be specifically: When an insertion loss of the signal light with the wavelength of $\lambda_i$ in the wavelength-dropping channel needs to be detected, a 1*T second optical switch 2042 of an output port of the tunable laser 2041 and a 1*N fourth optical switch 212 that corresponds to a to-be-detected second tributary port are first controlled, so that the output port of the tunable laser is connected to a 1*2 coupler 207 on the to-be-detected second tributary port. Then, the tunable laser 2041 is adjusted, so that the tunable laser 2041 outputs detection light with a wavelength of According to a wavelength-dropping channel detection principle described in FIG. 5, the detection light with the wavelength of $\lambda'_i$ is output through a multiplexing port other than a signal light port of a second wavelength division multiplexer/demultiplexer 203 corresponding to the to-be-detected second tributary port, and enters the detector 2052 after passing through a 1*T coupler 2051. The detector 2052 detects an output power of the detection light with the wavelength of $\lambda'_i$. Then, the processor may obtain an insertion loss 1 based on an input power and the output power of the detection light that has the wavelength of $\lambda'_i$ and that is generated by the tunable laser 2041. By subtracting an insertion loss of components, other than the first optical switch 201, through which the detection light with the wavelength of $\lambda'_i$ passes on an optical path of the wavelength-dropping channel from the insertion loss 1, an insertion loss of the detection light with the wavelength of $\lambda'_i$ in the first optical switch can be obtained. It may be approximately considered that the insertion loss of the detection light with the wavelength of $\lambda'_i$ in the first optical switch is the insertion loss of the signal light with the wavelength of $\lambda_i$ in the first optical switch.

When a structure shown in FIG. 16 is used to detect an insertion loss of the signal light with the wavelength of $\lambda_i$ in the first optical switch, a difference between the process and that in FIG. 15 is: A 1*N sixth optical switch 214 corresponding to a to-be-detected second tributary port is first controlled, so that an output port of the third tunable laser 213 is connected to a 1*2 coupler 207 on the to-be-detected second tributary port. Then, the third tunable laser 213 is adjusted, so that the third tunable laser 213 outputs detection light with a wavelength of $\lambda'_i$. For an optical path of the detection light with the wavelength of $\lambda'_i$ on the wavelength-dropping channel, refer to the description in FIG. 15, and details are not described herein again. In addition, in FIG. 16, an output power of the detection light with the wavelength of $\lambda'_i$ is detected by a detector connected to a second wavelength division multiplexer/demultiplexer that receives the detection light with the wavelength of an input power of the detection light with the wavelength of $\lambda'_i$ is provided by the third tunable laser 213.

Figure 17:
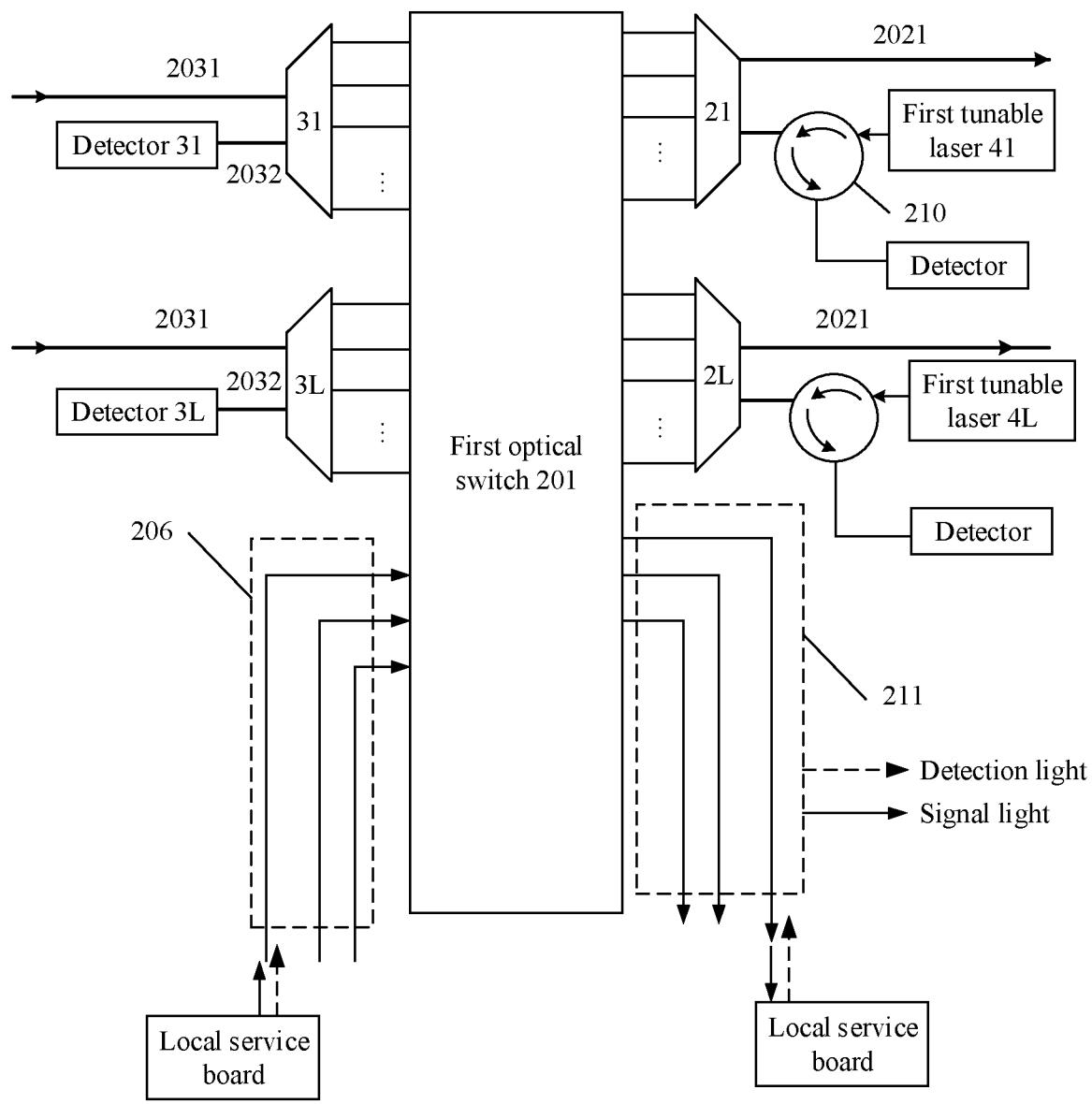

Optionally, as shown in FIG. 17, the first optical switch further includes M first tributary ports 206. The optical switching apparatus includes a multi-wavelength laser source, where a plurality of output ports of the multi-wavelength laser source are respectively connected to the M first tributary ports 206.

It should be understood that, in FIG. 17, for example, each first wavelength division multiplexer/demultiplexer 202 in the L first wavelength division multiplexers/demultiplexers 202 is connected to one first tunable laser, and each second wavelength division multiplexer/demultiplexer 203 in the L second wavelength division multiplexers/demultiplexers 203 is connected to one detector. In an actual process, when the plurality of output ports of the multi-wavelength laser source are respectively connected to the M first tributary ports 206, the L first wavelength division multiplexers/demultiplexers 202 may share one beam generation apparatus 204, and the L second wavelength division multiplexers/demultiplexers 203 may also share one detection apparatus 205. Details are not described herein again in this embodiment of this application.

For example, the multi-wavelength laser source may be a service board.

When an insertion loss of the detection light with the wavelength of $\lambda'_i$ on the wavelength-adding channel or the wavelength-dropping channel is calculated by using a structure shown in FIG. 17, reference may be specifically made to the foregoing description of the related parts, and details are not described herein again. A difference is that, in FIG. 17, the detection light with the wavelength of $\lambda'_i$ is generated by a local service board.

In an actual detection process, based on a scenario requirement, an optical switch connected to each first tributary port 206 or each second tributary port 211 and a wavelength of the tunable laser may be sequentially adjusted, so that insertion losses of all to-be-detected channels in the optical switching apparatus are detected in turn.

In the solution of this embodiment, a group of pass-through channels corresponding to each second wavelength division multiplexer/demultiplexer 203 and each group of wavelength-adding channels or wavelength-dropping channels each have one tunable laser. All group of channels may be detected in turn at a same time. This can effectively reduce an in-turn detection time. In addition, detection light on the pass-through channel does not pass through the second optical switch 2042, and in-turn detection is not limited by a switching time of the second optical switch 2042. A fast tunable laser is selected, so that a fast speed of the in-turn detection can be achieved.

It should be noted that, in an implementation process, one first wavelength division multiplexer/demultiplexer 202 and one second wavelength division multiplexer/demultiplexer 203 may be manufactured on one circuit board, which is referred to as a line board. One group of wavelength-adding ports and one group of wavelength-dropping ports are manufactured on one circuit board, which is referred to as a tributary board. The detector and the tunable laser in the embodiments of this application may be allocated to each tributary board or line board, so that implementation is more convenient.

Optionally, the optical switching apparatus provided in this embodiment of this application may further include a processor, connected to an output port of the detection apparatus 205, and configured to: obtain an input power of the laser light and the output power that is of the laser light and that is obtained by the detection apparatus 205, and determine an insertion loss of the first optical switch 201 based on the output power of the laser light and the input power of the laser light.

Specifically, the processor is specifically configured to calculate an insertion loss 1 of the laser light on an entire to-be-detected channel (the pass-through channel, the wavelength-adding channel, or the wavelength-dropping channel) based on the input power of the laser light and the output power that is of the laser light and that is obtained by the detection apparatus 205. By subtracting an insertion loss 2 of components other than the first optical switch 201 from the insertion loss 1, an insertion loss 3 of the laser light in the first optical switch 201 can be obtained. Because the insertion loss of the first optical switch 201 is insensitive to a wavelength, it may be approximately considered that the insertion loss 3 is an insertion loss of signal light on the to-be-detected channel in the first optical switch 201.

The processor in the embodiments of this application may be a general-purpose central processing unit (CPU), a microprocessor, an application-specific integrated circuit (ASIC), or one or more integrated circuits configured to control program execution of the solutions of this application. The input power can be obtained from the beam generation apparatus, or may be preconfigured in the processor. This is not limited in this embodiment of this application.

Optionally, an embodiment of this application provides an optical switching system. The optical switching system includes at least two optical switching apparatuses shown in any one of FIG. 6 to FIG. 17. Any two optical switching apparatuses communicate with each other through a line port.

It should be noted that reference may be made to each other for the embodiments of this application. For example, for same or similar steps, mutual reference may be made between the method embodiment and the apparatus embodiment. This is not limited.

Figure 18:
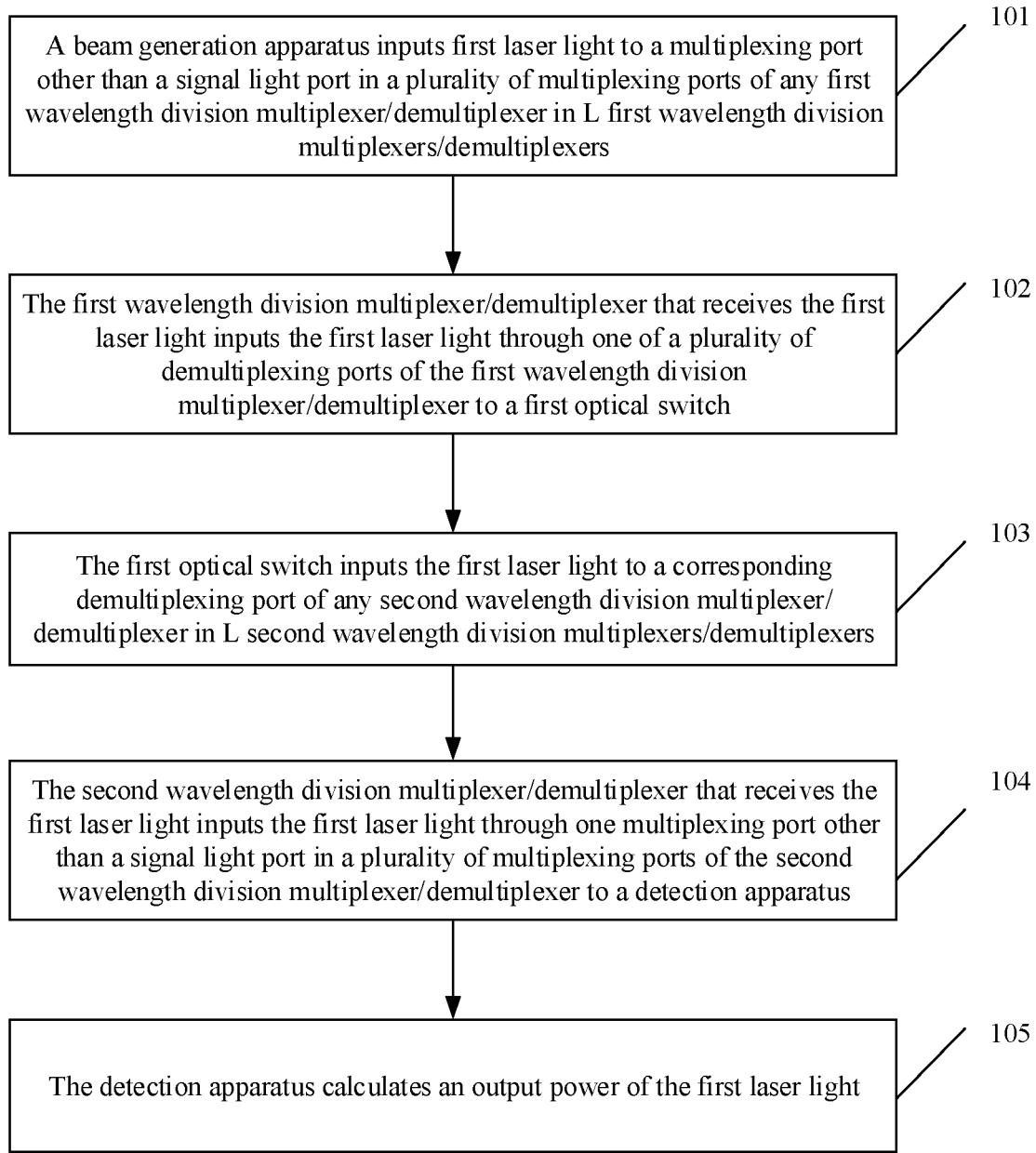
FIG. 18 is a schematic flowchart 1 of a power calculation method according to an embodiment of this application.

FIG. 18 is a schematic flowchart of a power calculation method according to this application. The method may be used for an optical switching apparatus, for example, any optical switching apparatus shown in FIG. 6 to FIG. 17.

For example, when the method is used for a structure shown in FIG. 6 (for a specific structure, refer to the description in FIG. 6, and details are not described herein again), the method includes the following steps.

Step 101: A beam generation apparatus 204 inputs first laser light to a multiplexing port 2022 other than a signal light port in a plurality of multiplexing ports of any first wavelength division multiplexer/demultiplexer 202 in L first wavelength division multiplexers/demultiplexers 202.

It should be understood that the beam generation apparatus 204 generates first laser light with one wavelength each time, and then inputs the first laser light to the multiplexing port 2022 other than the signal light port in the plurality of multiplexing ports of the any first wavelength division multiplexer/demultiplexer 202 in the L first wavelength division multiplexers/demultiplexers 202.

Step 102: The first wavelength division multiplexer/demultiplexer 202 that receives the first laser light inputs the first laser light through one of a plurality of demultiplexing ports 2023 of the first wavelength division multiplexer/demultiplexer 202 to a first optical switch 201.

Step 103: The first optical switch 201 inputs the first laser light to a corresponding demultiplexing port 2033 of any second wavelength division multiplexer/demultiplexer 203 in L second wavelength division multiplexers/demultiplexers 203.

Step 104: The second wavelength division multiplexer/demultiplexer 203 that receives the first laser light inputs the first laser light through one multiplexing port 2032 other than a signal light port in a plurality of multiplexing ports of the second wavelength division multiplexer/demultiplexer to a detection apparatus 205.

Step 105: The detection apparatus 205 calculates an output power of the first laser light.

According to the power calculation method provided in this embodiment of this application, the L first wavelength division multiplexers/demultiplexers and the L second wavelength division multiplexers/demultiplexers are included. Each wavelength division multiplexer/demultiplexer has a signal light port and a remaining multiplexing port. In this way, laser light may be input to the remaining multiplexing port of the L first wavelength division multiplexers/demultiplexers by the beam generation apparatus, and then the first optical switch inputs the received laser light to the demultiplexing ports of the L second wavelength division multiplexers/demultiplexers. Then, any second wavelength division multiplexer/demultiplexer that receives the laser light and that is in the L second wavelength division multiplexers/demultiplexers sends the received laser light through a remaining multiplexing port of the second wavelength division multiplexer/demultiplexer to the detection apparatus, so that the detection apparatus obtains an output power of the output laser light. In comparison with the conventional technology, the optical switching apparatus provided in this embodiment of this application can still obtain the output power of the laser light when there is no signal light. Therefore, an insertion loss of the first optical switch can be obtained based on an input power of the laser light and the output power of the laser light. In this way, in scenarios of channel closed-loop, power-on self-test, and unused-channel detection, the insertion loss of the first optical switch can still be obtained even if there is no service light on the channel.

Optionally, when the optical switching apparatus uses the structure shown in FIG. 8, step 101 may be specifically implemented in the following manner: A tunable laser 2041 generates the first laser light, and inputs the first laser light to a second optical switch 2042. The second optical switch 2042 switches the first laser light to a target multiplexing port of the any first wavelength division multiplexer/demultiplexer 202.

It should be understood that, that the second optical switch 2042 switches the first laser light to a target multiplexing port of the any first wavelength division multiplexer/demultiplexer 202 means that the second optical switch 2042 switches the first laser light to one multiplexing port other than the signal light port of the any first wavelength division multiplexer/demultiplexer 202.

It should be noted that, if there are two or more detection light ports, a quantity of lasers should be the same as a quantity of the detection light ports.

When the optical switching apparatus uses the structure shown in FIG. 8, step 105 may be specifically implemented in the following manner: A coupler 2052 couples, to a detector 2051, the first laser light from the second wavelength division multiplexer/demultiplexer 203. The detector 2051 detects an output power of the first laser light output by the second wavelength division multiplexer/demultiplexer 203.

It should be understood that if the coupler 2052 receives a plurality of beams of first laser light from different second wavelength division multiplexers/demultiplexers 203, the coupler 2052 sequentially couples, to the detector 2051, the first laser light from each second wavelength division multiplexer/demultiplexer 203. In this way, the detector 2051 can each time detect an output power of the first laser light that is from one second wavelength division multiplexer/demultiplexer 203.

Optionally, when the beam generation apparatus 204 uses the structure shown in FIG. 9, step 101 may be specifically implemented in the following manner: Each first tunable laser (for example, a first tunable laser 41, a first tunable laser 42, . . . , or a first tunable laser 4L) inputs the first laser light to a multiplexing port connected to the first tunable laser.

For example, the first tunable laser 41 inputs the first laser light to a multiplexing port 2022 of a first wavelength division multiplexer/demultiplexer 21 connected to the first tunable laser 41.

Optionally, when the detection apparatus 205 uses the structure shown in FIG. 9, step 105 may be specifically implemented in the following manner: Each detector detects an output power of the first laser light output through a multiplexing port connected to the detector.

For example, a detector 51 detects an output power of the first laser light output through a multiplexing port 2032 of a second wavelength division multiplexer/demultiplexer 31. A detector 52 detects an output power of the first laser light output through a multiplexing port 2032 of a second wavelength division multiplexer/demultiplexer 32.

Figure 19A:
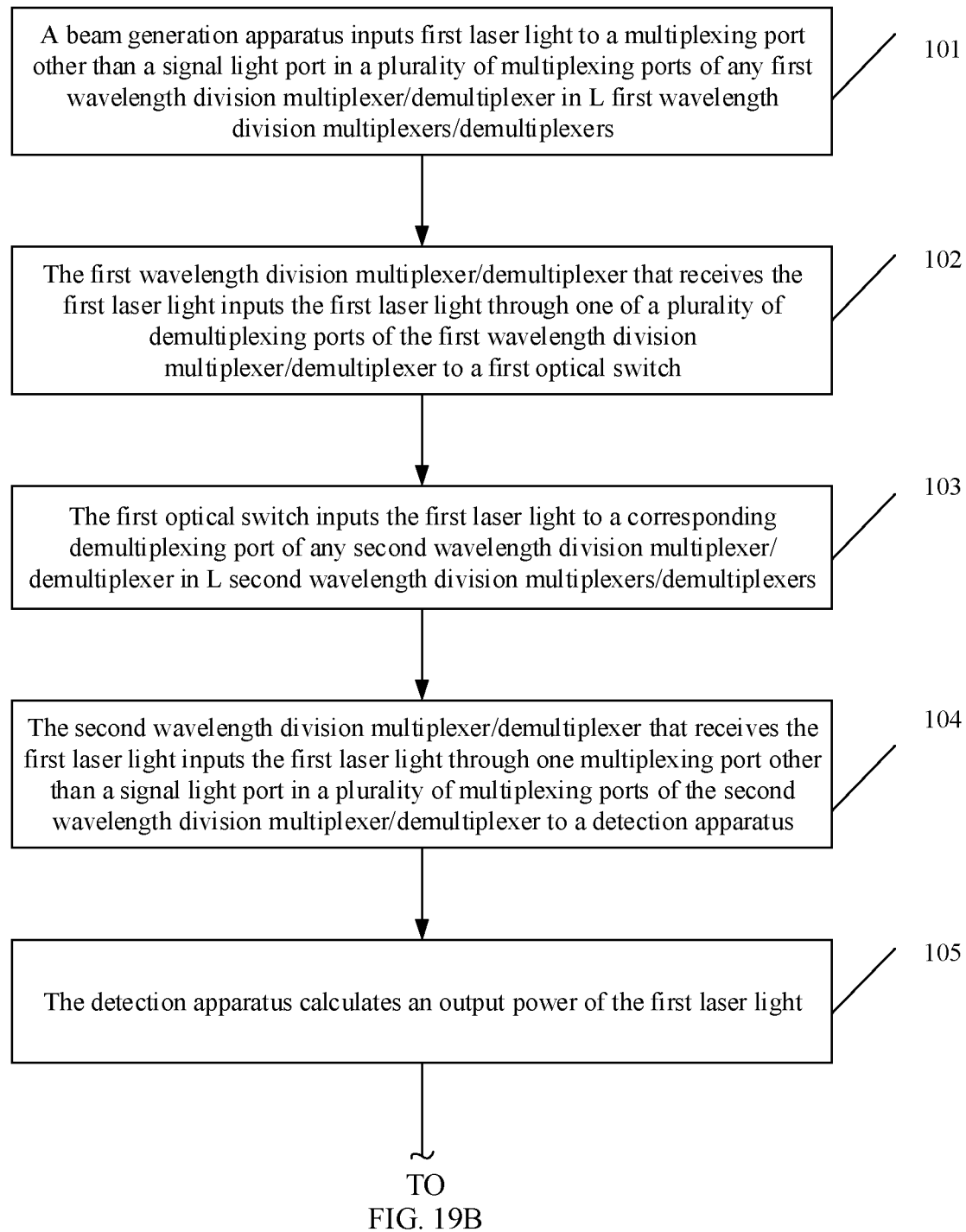
FIG. 19A and FIG. 19B are a schematic flowchart 2 of a power calculation method according to an embodiment of this application.
Figure 19B:
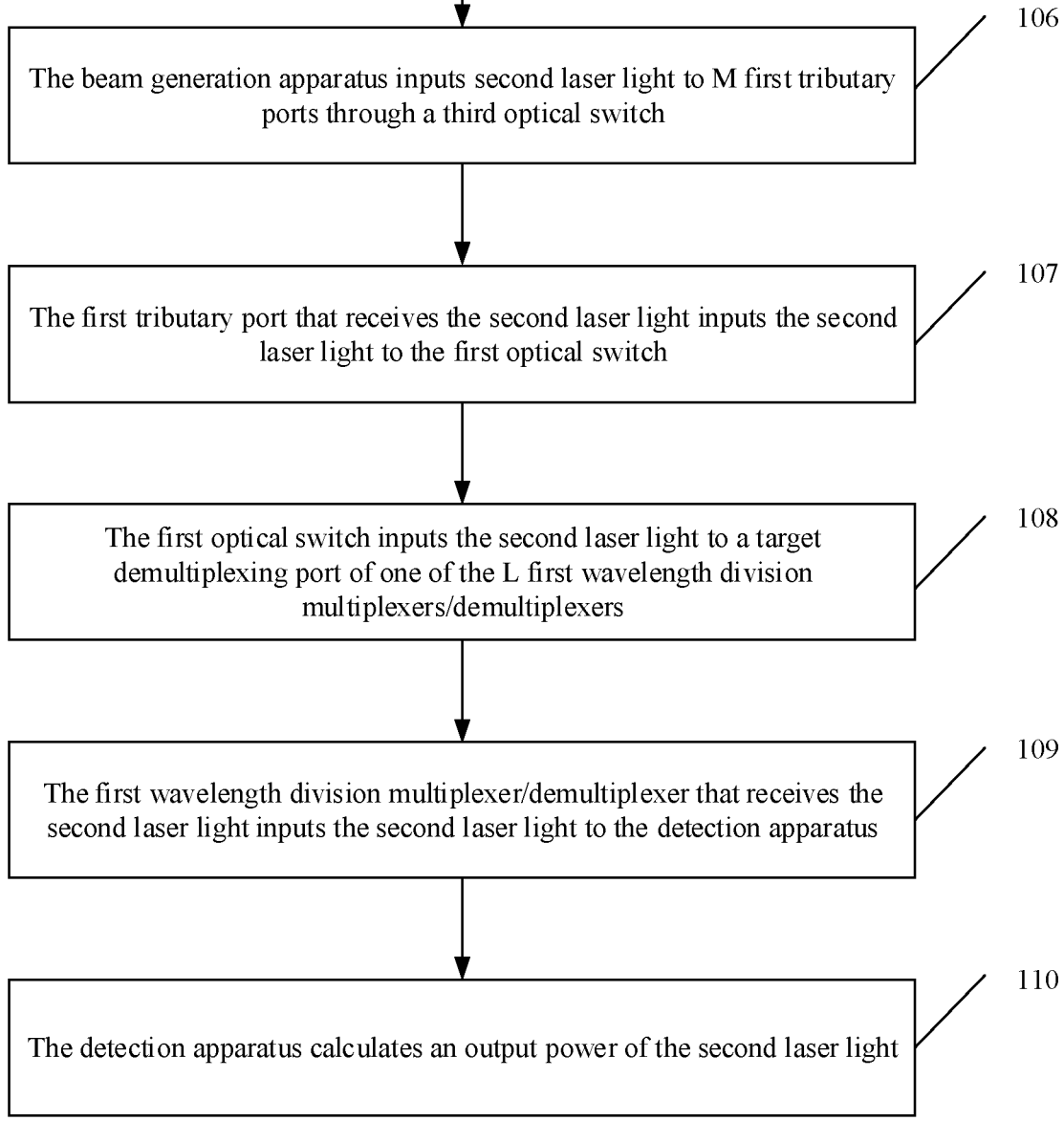

Optionally, when the optical switching apparatus uses the structure shown in FIG. 10, in other words, when the first optical switch 201 further includes M first tributary ports 206, the optical switching apparatus further includes a third optical switch 2043. The third optical switch 2043 is connected to both the beam generation apparatus 204 and the M first tributary ports 206, where M is a positive integer. As shown in FIG. 19A and FIG. 19B, the method provided in this embodiment of this application further includes the following steps.

Step 106: The beam generation apparatus 204 inputs second laser light to the M first tributary ports 206 through the third optical switch 2043.

Specifically, step 106 in FIG. 10 may be specifically implemented in the following manner: The tunable laser 2041 generates the second laser light, and inputs the second laser light to the second optical switch 2042. The second optical switch 2042 switches the second laser light to the third optical switch 2043. The third optical switch 2043 selects one first tributary port 206 from the M first tributary ports 206, and inputs the second laser light to the selected first tributary port 206.

Specifically, when an optical splitter or a coupler 207 exists on each first tributary port, the third optical switch 2043 inputs the second laser light to a detection light port of an optical splitter or a coupler 207 that is connected in series to the selected first tributary port 206.

Step 107: The first tributary port that receives the second laser light inputs the second laser light to the first optical switch 201.

Step 108: The first optical switch 201 inputs the second laser light to a target demultiplexing port of one of the L first wavelength division multiplexers/demultiplexers.

Step 109: The first wavelength division multiplexer/demultiplexer that receives the second laser light inputs the second laser light to the detection apparatus 205.

Step 110: The detection apparatus 205 obtains an output power of the second laser light.

It should be understood that in the structure shown in FIG. 10, step 110 may be specifically implemented in the following manner: The detector 2052 sequentially detects the output power of the second laser light that is input to the detection apparatus and that is output by the first wavelength division multiplexer/demultiplexer.

In addition, on a wavelength-adding channel, step 109 may be replaced in the following manner: A second wavelength division multiplexer/demultiplexer that receives the second laser light inputs the second laser light to the detection apparatus 205.

Optionally, when the optical switching apparatus uses the structure shown in FIG. 11 or FIG. 12, step 106 provided in this embodiment of this application may alternatively be replaced in the following manner: A second tunable laser 208 inputs the second laser light to the M first tributary ports 206 through a fifth optical switch 209. When the optical switching apparatus uses the structure shown in FIG. 12, in other words, when each first wavelength division multiplexer/demultiplexer is connected to one detector, step 109 may alternatively be replaced in the following manner: A second wavelength division multiplexer/demultiplexer that receives the second laser light inputs the second laser light to a detector connected to the second wavelength division multiplexer/demultiplexer.

Optionally, as shown in FIG. 13, when the M first tributary ports 206 correspond to the L first wavelength division multiplexers/demultiplexers 202, the optical switching apparatus further includes a plurality of circulators 210. A first port of each circulator 210 in the plurality of circulators 210 is connected to the beam generation apparatus, a second port of each circulator 210 is connected to one multiplexing port other than the signal light port of the first wavelength division multiplexer/demultiplexer, and a third port of each circulator 210 is connected to the detection apparatus 205. In this case, step 109 may be specifically implemented in the following manner: The circulator receives the second laser light through the second port, and inputs the second laser light to the detection apparatus 205 through the third port. For example, the circulator inputs the second laser light through the third port to a coupler 2051, and the coupler 2051 couples the second laser light to a detector 2052.

Optionally, when the L second wavelength division multiplexers/demultiplexers correspond to the M first tributary ports in this embodiment of this application, in other words, when second laser light in any first tributary port in the M first tributary ports is output from one of the L second wavelength division multiplexers/demultiplexers, step 109 may alternatively be replaced in the following manner: A second wavelength division multiplexer/demultiplexer that receives the second laser light inputs the second laser light to the detection apparatus.

Specifically, the first wavelength division multiplexer/demultiplexer that receives the second laser light inputs the second laser light to the coupler 2051, and the coupler 2051 couples, to the detector 2052, the received second laser light from the first wavelength division multiplexer/demultiplexer.

Optionally, the method provided in this embodiment of this application further includes: The M first tributary ports included in the first optical switch receives laser light from a multi-wavelength laser source.

Optionally, the method provided in this embodiment of this application further includes: A processor obtains an output power that is of the laser light and that is obtained by the detection apparatus, and calculates a power loss of the laser light based on an input power of the laser light.

For example, the input power of the laser light can be obtained from the beam generation apparatus.

For example, the processor obtains the output power that is of the first laser light and that is obtained by the detection apparatus, and calculates a power loss of the first laser based on an input power of the first laser light.

For example, the processor obtains the output power that is of the second laser light and that is obtained by the detection apparatus, and calculates a power loss of the second laser based on an input power of the second laser light.

It should be understood that, in this embodiment of this application, the power loss of the first laser light may be an insertion loss of the first laser light on a to-be-detected channel.

Finally, it should be noted that the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An optical switching apparatus, comprising:
a first optical switch,
at least one first wavelength division multiplexer/demultiplexer and at least one second wavelength division multiplexer/demultiplexer connected to the first optical switch,
wherein the at least one first wavelength division multiplexer/demultiplexer and the at least one second wavelength division multiplexer/demultiplexer each comprises a plurality of multiplexing ports and a plurality of demultiplexing ports;
one of the plurality of multiplexing ports of any first wavelength division multiplexer/demultiplexer in the at least one first wavelength division multiplexer/demultiplexer is a signal light port, a remaining multiplexing port of the first wavelength division multiplexer/demultiplexer is connected to a beam generation apparatus, and the plurality of demultiplexing ports of the first wavelength division multiplexer/demultiplexer are connected to the first optical switch;
one of the plurality of multiplexing ports of any second wavelength division multiplexer/demultiplexer in the at least one second wavelength division multiplexer/demultiplexer is a signal light port, a remaining multiplexing port of the second wavelength division multiplexer/demultiplexer is connected to a detection apparatus, and the plurality of demultiplexing ports of the second wavelength division multiplexer/demultiplexer are connected to the first optical switch;
the beam generation apparatus is connected to the at least one first wavelength division multiplexer/demultiplexer, the beam generation apparatus is configured to input first laser light to a multiplexing port other than a signal light port in a plurality of multiplexing ports of any first wavelength division multiplexer/demultiplexer;
the detection apparatus is connected to the at least one second wavelength division multiplexer/demultiplexer and is configured to obtain an output power of the first laser light;
the first optical switch further comprises one or more first tributary ports, and the optical switching apparatus further comprises a second optical switch, wherein the second optical switch is connected to both the beam generation apparatus and the one or more first tributary ports; and
the one or more first tributary ports correspond to the at least one first wavelength division multiplexer/demultiplexer and the optical switching apparatus further comprises a plurality of circulators, wherein:
a first port of each circulator in the plurality of circulators is connected to the beam generation apparatus, a second port of each circulator is connected to one multiplexing port other than the signal light port of the first wavelength division multiplexer/demultiplexer, and a third port of each circulator is connected to the detection apparatus.

2. The optical switching apparatus according to claim 1, further compromising a tunable laser and a third optical switch, wherein:
the third optical switch is connected to both the tunable laser and the remaining multiplexing port of the first wavelength division multiplexer/demultiplexer, and is configured to switch laser light output by the tunable laser to a target multiplexing port of the first wavelength division multiplexer/demultiplexer.

3. The optical switching apparatus according to claim 2, wherein the detection apparatus further comprises a detector and a coupler, wherein:
the coupler is connected to both the detector and the remaining multiplexing port of the second wavelength division multiplexer/demultiplexer, and is configured to couple laser light output through the remaining multiplexing port of the second wavelength division multiplexer/demultiplexer to the detector.

4. The optical switching apparatus according to claim 1, wherein the beam generation apparatus comprises a plurality of first tunable lasers, and each first tunable laser in the plurality of first tunable lasers is connected to one multiplexing port other than the signal light port of each of the at least one first wavelength division multiplexer/demultiplexer.

5. The optical switching apparatus according to claim 4, wherein the detection apparatus comprises a plurality of detectors, and each detector is connected to one multiplexing port other than the signal light port of each of the at least one second wavelength division multiplexer/demultiplexer.

6. The optical switching apparatus according to claim 1, wherein the second optical switch is connected to both the beam generation apparatus and the one or more first tributary ports of the first optical switch.

7. The optical switching apparatus according to claim 6, wherein the first optical switch further comprises one or more second tributary ports, and the optical switching apparatus further comprises a third optical switch, wherein the third optical switch is connected to both the beam generation apparatus and the one or more second tributary ports of the first optical switch.

8. The optical switching apparatus according to claim 1, wherein the optical switching apparatus comprises a multi-wavelength laser source, wherein a plurality of output ports of the multi-wavelength laser source are respectively connected to the one or more first tributary ports of the first optical switch.

9. The optical switching apparatus according to claim 1, further comprising a processor connected to an output port of the detection apparatus, and configured to:
   obtain the output power of the first laser light; and
   determine an insertion loss of the first optical switch based on the output power and an input power.

10. The optical switching apparatus according to claim 1, wherein the beam generation apparatus is further configured to input second laser light to the one or more first tributary ports of the first optical switch through the second optical switch,
   the first optical switch is configured to input the second laser light to a target demultiplexing port of one of the at least one second wavelength division multiplexer/demultiplexer,
   the second wavelength division multiplexer/demultiplexer that receives the second laser light inputs the second laser light to the detection apparatus, and
   the detection apparatus is further configured to obtain an output power of the second laser light.

11. A power calculation method for an optical switching apparatus, comprising:
   inputting, by a beam generation apparatus, first laser light to a multiplexing port other than a signal light port in a plurality of multiplexing ports of any first wavelength division multiplexer/demultiplexer in at least one first wavelength division multiplexer/demultiplexer;
   inputting, by the first wavelength division multiplexer/demultiplexer that receives the first laser light, the first laser light through one of a plurality of demultiplexing ports of the first wavelength division multiplexer/demultiplexer to a first optical switch;
   inputting, by the first optical switch, the first laser light to a corresponding demultiplexing port of any second wavelength division multiplexer/demultiplexer in at least one second wavelength division multiplexer/demultiplexer;
   inputting, by the second wavelength division multiplexer/demultiplexer that receives the first laser light, the first laser light through one multiplexing port other than a signal light port in a plurality of multiplexing ports of the second wavelength division multiplexer/demultiplexer to a detection apparatus; and
   obtaining, by the detection apparatus, an output power of the first laser light,
   wherein the first optical switch further comprises one or more first tributary ports, and the optical switching apparatus further comprises a second optical switch, the second optical switch is connected to both the beam generation apparatus and the one or more first tributary ports, and the method further comprises:
   inputting, by the beam generation apparatus, second laser light to the one or more first tributary ports through the second optical switch;
   inputting, by the first optical switch, the second laser light to a target demultiplexing port of one of the at least one first wavelength division multiplexer/demultiplexer;
   inputting, by the first wavelength division multiplexer/demultiplexer that receives the second laser light, the second laser light to the detection apparatus; and
   obtaining, by the detection apparatus, an output power of the second laser light,
   wherein when the one or more first tributary ports correspond to the at least one first wavelength division multiplexer/demultiplexer, the optical switching apparatus further comprises a plurality of circulators, wherein a first port of each circulator in the plurality of circulators is connected to the beam generation apparatus, a second port of each circulator is connected to one multiplexing port other than the signal light port of the first wavelength division multiplexer/demultiplexer, and a third port of each circulator is connected to the detection apparatus; and
   the inputting, by the first wavelength division multiplexer/demultiplexer that receives the second laser light, the second laser light to the detection apparatus comprises:
   inputting, by the first wavelength division multiplexer/demultiplexer that receives the second laser light, the second laser light to the second port of the circulator; and
   inputting, by the circulator, the second laser light through the third port of the circulator to the detection apparatus.

12. The method according to claim 11, wherein the optical switching apparatus comprises a tunable laser and a third optical switch; and
   the inputting, by the beam generation apparatus, first laser light to a multiplexing port other than a signal light port in a plurality of multiplexing ports of any first wavelength division multiplexer/demultiplexer in the at least one first wavelength division multiplexer/demultiplexer comprises:
   generating, by the tunable laser, the first laser light and inputting the first laser light to the third optical switch; and
   switching, by the third optical switch, the first laser light to a target multiplexing port of any first wavelength division multiplexer/demultiplexer.

13. The method according to claim 12, wherein the detection apparatus further comprises a detector and a coupler, and the obtaining, by the detection apparatus, an output power of the first laser light comprises:
   coupling, by the coupler, the first laser light from the second wavelength division multiplexer/demultiplexer to the detector; and
   calculating, by the detector, the output power of the first laser light output by the second wavelength division multiplexer/demultiplexer.

14. The method according to claim 11, wherein the beam generation apparatus comprises a plurality of first tunable lasers, and each first tunable laser in the plurality of first tunable lasers is connected to one multiplexing port other than the signal light port of each of the at least one first wavelength division multiplexer/demultiplexer; and
   the inputting, by the beam generation apparatus, the first laser light to the multiplexing port other than the signal light port in the plurality of multiplexing ports of any first wavelength division multiplexer/demultiplexer in the at least one first wavelength division multiplexer/demultiplexer comprises inputting, by each first tunable laser, the first laser light to the connected multiplexing port.

15. The method according to claim 14, wherein the detection apparatus comprises a plurality of detectors, and each detector in the plurality of detectors is connected to the one multiplexing port other than the signal light port of each of the at least one second wavelength division multiplexer/demultiplexer; and the obtaining, by the detection apparatus, the output power of the first laser light comprises detecting, by each detector, the output power of the first laser light output through the connected multiplexing port.

16. The method according to claim 11, wherein the second optical switch is connected to both the beam generation apparatus and the one or more first tributary ports of the first optical switch, and the method further comprises:

inputting, by the beam generation apparatus, the second laser light to the one or more first tributary ports through the second optical switch;

inputting, by the first optical switch, the second laser light to a target demultiplexing port of one of the at least one first wavelength division multiplexer/demultiplexer;

inputting, by the first wavelength division multiplexer/demultiplexer that receives the second laser light, the second laser light to the detection apparatus; and obtaining, by the detection apparatus, an output power of the second laser light.

17. The method according to claim 11, wherein the method further comprises:

receiving, by the one or more first tributary ports comprised in the first optical switch, laser light from a multi-wavelength laser source.

18. The method according to claim 11, wherein the method further comprises:

obtaining, by a processor, the output power the first laser light that is obtained by the detection apparatus, and calculating a power loss of the first laser light based on an input power of the first laser light.

19. The power calculation method according to claim 11, further comprising:

inputting, by the beam generation apparatus, second laser light to the one or more first tributary ports of the first optical switch through the second optical switch;

inputting, by the first optical switch, the second laser light to a target demultiplexing port of one of the at least one second wavelength division multiplexer/demultiplexer;

inputting, by the second wavelength division multiplexer/demultiplexer that receives the second laser light, the second laser light to the detection apparatus; and obtaining, by the detection apparatus, an output power of the second laser light.

* * * * *

UNITED STATES PATENT AND TRADEMARK OFFICE
CERTIFICATE OF CORRECTION

PATENT NO. : 11,641,246 B2
APPLICATION NO. : 17/362874
DATED : May 2, 2023
INVENTOR(S) : Chunhui Zhang It is certified that error appears in the above-identified patent and that said Letters Patent is hereby corrected as shown below:

In the Specification

Column 3, Line 60, change "The character "I"" to --The character "/"--;

Column 9, Line 50, change "with the wavelength of" to --with the wavelength of $\lambda_N$--; and In the Claims Claim 2, Column 28, Line 28, change "compromising" to --comprising--.

Signed and Sealed this
Thirtieth Day of May, 2023

Katherine Kelly Vidal
*Director of the United States Patent and Trademark Office*